United States Patent
Murakami

(10) Patent No.: US 7,407,686 B2
(45) Date of Patent: Aug. 5, 2008

(54) OPTICAL FILM, POLARIZING PLATE AND DISPLAY DEVICE UTILISING THE FILM, AND PRODUCTION METHOD OF OPTICAL FILM

(75) Inventor: Takashi Murakami, Hachioji (JP)

(73) Assignee: Konica Corporation, Tokyo (JP)

( * ) Notice: Subject to any disclaimer, the term of this patent is extended or adjusted under 35 U.S.C. 154(b) by 153 days.

(21) Appl. No.: 11/237,345

(22) Filed: Sep. 28, 2005

(65) Prior Publication Data

US 2006/0062936 A1    Mar. 23, 2006

Related U.S. Application Data

(62) Division of application No. 10/371,119, filed on Feb. 21, 2003, now abandoned.

(30) Foreign Application Priority Data

Feb. 26, 2002  (JP)  ............................ 2002-049724

(51) Int. Cl.
*B05D 5/06*  (2006.01)

(52) U.S. Cl. .................... 427/162; 427/163.1; 427/164; 427/171; 427/172; 427/173; 427/576; 427/585; 427/255.31; 427/255.5; 427/279; 427/384; 427/385.5; 427/415; 359/483; 359/485; 359/493; 359/500; 264/1.31; 264/1.34

(58) Field of Classification Search ............... 427/162, 427/163.1, 164, 171–173, 576, 585, 255.31, 427/255.5, 379, 384, 385.5, 415; 359/483, 359/485, 493, 500; 264/1.31, 1.34

See application file for complete search history.

(56) References Cited

U.S. PATENT DOCUMENTS

| | | | |
|---|---|---|---|
| 5,705,632 A * | 1/1998 | Shimoda et al. ................. 536/69 |
| 5,753,140 A * | 5/1998 | Shigemura ............. 252/299.01 |
| 5,909,314 A * | 6/1999 | Oka et al. .................... 359/582 |
| 6,008,940 A * | 12/1999 | Michihata et al. ........... 359/483 |
| 2002/0034013 A1* | 3/2002 | Nakamura et al. .......... 359/603 |

FOREIGN PATENT DOCUMENTS

| | | | |
|---|---|---|---|
| JP | 04-152125 A | * | 5/1992 |
| JP | 11-48271 A | * | 2/1999 |
| JP | 2001-226495 A | * | 8/2001 |

* cited by examiner

*Primary Examiner*—Alain L. Bashore
(74) *Attorney, Agent, or Firm*—Lucas & Mercanti, LLP

(57) ABSTRACT

An optical film is disclosed having minimal curl, minimal coating unevenness and no cracks. The optical film is obtained by casting a dope comprising a cellulose ester and a non-chlorinated solvent on a metal support, the cellulose ester having a total acyl substitution degree of 2.6 to 2.85 and having a ratio of a weight-average molecular weight to a number-average molecular weight of 1:1 to 3:1; drying the cast dope on the metal support so as to obtain a cellulose ester film; peeling the cellulose ester film from the metal support; further drying the cellulose ester film while providing a longitudinal stretch or a lateral stretch to the cellulose ester film; and providing a metal oxide layer on the cellulose ester film.

9 Claims, 2 Drawing Sheets

OPTICAL FILM, POLARIZING PLATE AND DISPLAY DEVICE UTILISING THE FILM, AND PRODUCTION METHOD OF OPTICAL FILM

CROSS REFERENCE TO RELATED APPLICATION

This is a Divisional Application of U.S. patent application Ser. No. 10/371,119, filed Feb. 21, 2003, now abandoned, which, in turn, claimed the priority of Japanese Patent Application No. JP2002-049724, filed Feb. 26, 2002.

FIELD OF THE INVENTION

The present invention relates to a cellulose ester film, and particularly to an optical film having improved visibility by forming a metal oxide layer on a cellulose ester film.

BACKGROUND OF THE INVENTION

Further improvement of visibility has been required with higher resolution of display device. Moving image display such as liquid crystal TV is still inferior in visibility and improvement thereof has been required. Further improvement of the durability has also come to be required with respect to outdoor use of cell phones, notebook personal computers and car navigation systems. An object of the present invention is to provide an optical film provided with a metal oxide layer, which is utilized as an anti-reflection film or an electric conductive film for improving visibility of display devices, having minimal appearance of cracks and enough durability for the outdoor use thereof. Specifically, with respect to a metal oxide layer provided on a cellulose ester film, which utilized preferably as a protective film of a polarizing plate or an anti-reflection film, there were problems of marked coating unevenness and easy generation of cracks.

SUMMARY OF THE INVENTION

An object of the invention is to provide an optical film, when a metal oxide film is formed thereon, having minimal curl, minimal coating unevenness and no cracks.

Another object of the invention is to provide an optical film having superior visibility.

The present invention is characterized in that a dope, which contains a solvent including essentially no chlorine type solvent and a cellulose ester, having a total acyl group substitution degree of from 2.6 to 2.85 and a ratio of molecular weight distribution $M_w/M_n$ of from 1.0 to 3.0, is cast on a metal support, peeled off after being dried so as to be made peelable and dried providing tension in a width or longitudinal direction to prepare a cellulose ester film, and a metal oxide layer is formed on thus prepared film directly or through other intervening layers.

A non-chlorinated solvent of the present invention means a solvent containing a chloride type solvent such as methylene chloride in an amount of not more than 10 weight %, preferably not more than 5 weight % and most preferably 0 weight %, based on the total amount of the solvent. Solvents utilized are ones containing one or more solvents such as methyl acetate, ethyl acetate, methyl acetoacetate and acetone.

A ratio of molecular weight distribution $M_w/M_n$ exceeding 3.0 is not preferred because cracks are easily caused in a metal oxide layer. Further, a total substitution degree of an acyl group is necessarily from 2.6 to 2.85, because cracks are easily caused at a substitution degree of less than 2.6 and curl becomes strong at more than 2.85, which are not preferable. Further, cracks in a metal oxide layer formed on a cellulose ester film can be minimized by utilizing a cellulose ester film which is prepared by drying while tension in the width or longitudinal direction is applied during the drying process after being peeled off.

In case of dissolving cellulose ester with a solvent which contains essentially no chlorine type solvents, an optical film with further minimized appearance of cracks can be obtained by utilizing a dope prepared by means of a cooled dissolution method. The reason is not clear, but it is considered that the cellulose ester solution thus prepared is stable so as to form a uniform cellulose ester film having no local residual stress in a drying process and the cellulose ester film itself is hardly suffer from uneven deformation (shrinkage or expansion) during or after the preparation process of a metal oxide layer.

In the invention, a cellulose ester film is further preferably contain from 0.5 to 30 weight % of an additive having not less than three of aromatic rings, cycloalkyl rings or cycloalkenyl rings in a molecule. The additives can be incorporated as a UV absorbent or an anti-oxidant. Thereby, crack generation is further depressed and a metal oxide layer having an uniform layer thickness is formed as well as curl generation is decreased.

The means to prepare a metal oxide layer is not specifically limited and it can be prepared by a method in which a coating solution containing metal oxide fine particles is coated, or by methods such as evaporation and CVD.

Specifically preferable method in the invention is one in which a thin film is formed by plasma discharge treatment while supplying a reactive gas to a space between electrodes under a pressure of atmospheric pressure or the vicinity.

The plasma discharge treatment method is a method also called a normal pressure plasma method or an atmospheric pressure plasma discharge treatment method (hereinafter, the plasma discharge treatment under a pressure of atmospheric pressure or the vicinity may be simply referred as plasma discharge treatment), and a thin film is formed on a cellulose ester film by a plasma generated by means of electric discharge while an reactive gas is supplied to the space between electrodes which are placed under a pressure of atmospheric pressure or the vicinity.

However, although the method is extremely fast in a thin film formation speed, there was a problem of easy appearance of uneven layer thickness of a thin film layer formed in case of forming a thin film layer continuously on a long roll cellulose ester film.

Consequently, the inventors have found, after extensive study to solve the problem, that it is possible to minimize crack generation in a metal oxide layer remarkably and to reduce curl of a film prepared largely by utilizing a cellulose ester film which is prepared in such a way that a dope, which contains a solvent including essentially no chlorine type solvents and a cellulose ester having a total acyl group substitution degree of from 2.6 to 2.85 and a ratio of molecular weight distribution $M_w/M_n$ of from 1.0 to 3.0, is cast on a metal support and peeled off after being dried so as to be made peelable and dried providing tension in a width or longitudinal direction to prepare a cellulose ester film.

Further, a thin film layer can be formed on a cellulose ester film continuously for a long period, and a stable optical film having minimal appearance of cracks in a metal oxide thin film layer and superior durability in respect to no milky-whitening and minimal lowering of electric conductivity when stored in environment of high temperature and high humidity, has been obtained.

In the invention, a specifically preferable metal oxide layer is one formed by means of a plasma CVD (Chemical Vapor Deposition) method. According to the invention, it is possible to restrain phenomena markedly such as extraordinarily strong curl caused while a metal oxide layer being formed by a plasma CVD method or cracks caused under conditions of high temperature and humidity. Further, it is superior in respect to environment because no chlorine type solvents are used.

An optical film of the invention can be utilized as a protective film of a polarizing plate, an anti-reflection film, an anti-glaring anti-reflection film, a phase transforming film, an electric conductive film, an anti-static film, a brightness enhancing film, an optical compensation film, a viewing angle enlarging film and the like. The yield of a polarizing plate utilizing the optical film of the invention is high. Further, a display device utilizing the polarizing plate or the optical film can maintain superior visibility for a long period even under conditions of high temperature and high humidity.

In the invention, the ratio $M_w/M_n$ of a weight average molecular weight ($M_w$) to a number average molecular weight ($M_n$), of cellulose ester utilized in an optical film of the invention, is preferably not more than 3.0 and more preferably from 1.4 to 3.0, because uneven film thickness is reduced as well as durability is improved.

Since an average molecular weight and a molecular weight distribution of cellulose ester can be measured by use of high-speed liquid chromatography, a number average molecular weight and a weight average molecular weight are calculated utilizing the same and the ratio thereof can be determined. The measurement conditions are as follows:

Solvent: methylene chloride
Column: Shodex K806, K805, K803G (three columns of products by Showa Denko K. K. were utilized in a junction)
Column temperature: 25° C.
Sample concentration: 0.1 weight %
Detector: RI Model 504 (produced by GL Science Co.)
Pump: L6000 (produced by Hitachi, Ltd.)
Flow amount: 1.0 ml/min
Calibration curve: calibration curves based on 13 samples of standard polystyrene STK, polystyrene (manufactured by Tosoh Corp.) $M_w$=500 to 1,000,000, were utilized.

Layer thickness of an optical film used in the invention is not specifically limited, and is generally from 10 to 500 μm and preferably from 10 to 150 μm.

Among them, in case of a cellulose ester film having a thickness of from 10 to 60 μm in which uneven layer thickness of a metal oxide layer is easily caused, remarkable effect of the invention is observed and the invention is specifically preferably utilized.

DETAILED DESCRIPTION OF THE INVENTION

Figure 1:
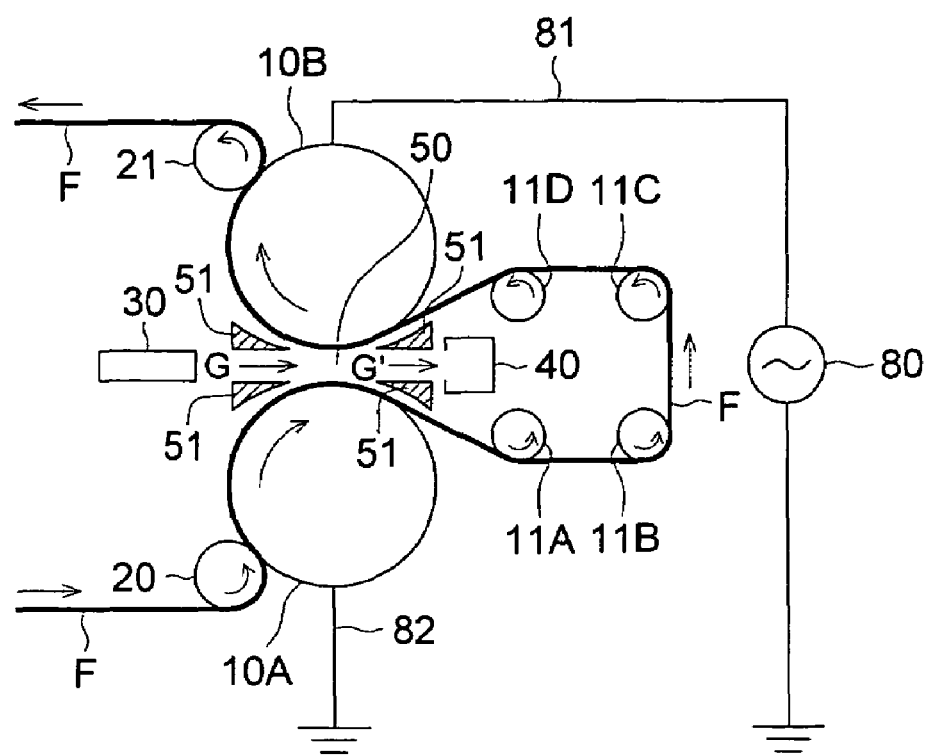
FIG. 1 is a schematic diagram illustrating an example of a plasma discharge treatment apparatus utilized for forming a metal oxide layer of the invention.

Now, cellulose ester used in the invention will be explained. As cellulose ester of the invention, utilized is a cellulose ester in which hydroxyl groups of the cellulose are substituted by an acyl group, especially by an acyl group having 2 to 4 carbon atoms, to an extent of a total acyl substitution degree of from 2.60 to 2.85.

Such cellulose ester includes cellulose diacetate, cellulose triacetate, cellulose acetatebutylate and cellulose acetatepropionate. Among them, cellulose triacetate, cellulose acetatebutylate and cellulose acetatepropionate are preferred. In these preferable cellulose esters, a substitution degree of an acetyl group of not less than 1.6 is specifically preferred.

Cellulose as a starting material of cellulose ester is not specifically limited, and includes cotton linter, wood pulp (originate in softwood, and in hardwood) and kenaf.

Further, each cellulose ester obtained therefrom can be utilized in combinations at any arbitrary mixing ratio. In case of an acylating agent is acid anhydride (acetic anhydride, propionic anhydride and butyric anhydride) as a cellulose starting material, cellulose ester can be prepared by an ordinary reaction procedure using an organic acid such as acetic acid or an organic solvent such as methylene chloride in the presence of a proton type catalyst such as sulfuric acid.

An example of a preparation method of cellulose ester is shown below. Cotton linter of 100 weight parts as a starting material of cellulose was crushed, and after being added thereto with 40 weight parts of acetic acid the system was pretreated for activation at 36° C. for 20 minutes. Thereafter, 8 weight parts of sulfuric acid, 260 weight parts of acetic anhydride and 350 weight parts of acetic acid were added, and esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with ten times of an acetic acid solution (acetic acid/water=1/1, based on weight ratio) at room temperature for 160 minutes, it was filtered and dried to obtain a purified acetyl cellulose having an acetyl substitution degree of 2.75. The acetyl cellulose has $M_n$ of 92,000, $M_w$ of 156,400, and $M_w/M_n$ of 1.7. In a similar manner, cellulose esters having different substitution degrees and $M_w/M_n$ ratios can be synthesized by controlling the esterification conditions of cellulose ester (temperature, time and stirring) and hydrolysis conditions.

Further, cellulose ester of mixed acids can be prepared by a reaction according to a method described in JP-A 10-45804 (the term, JP-A refers to unexamined and published Japanese Patent Application). An acyl substitution degree can be measured according to the definition of ASTM-D817-96.

A number average molecular weight ($M_n$) of cellulose ester is preferably from 70,000 to 250,000 and more preferably from 80,000 to 150,000, because it provides a large mechanical strength when being molded and an appropriate dope viscosity.

Cellulose ester thus obtained is dissolved in a solvent containing essentially no chlorine type solvents to prepare a viscous liquid called as a dope, and base preparation (casting of base) is performed generally by a method called as a solution casting method.

In the invention, it is preferred to apply a method called as a cooled dissolving method when cellulose ester is dissolved in solvents, because physical property of the cast film and characteristics of a metal oxide layer formed thereon are superior.

Cooled dissolving method will be explained below.

Swelling Process

In a swelling process, cellulose ester is mixed with organic solvents so as to be swelled by the solvents. The temperature of a swelling process is preferably from −10 to 55° C. It is usually performed at room temperature. The ratio of cellulose ester to organic solvents is determined according to the concentration of a solution to be finally obtained. Generally, the amount of cellulose ester in a mixture is preferably from 5 to 30 weight %, more preferably from 8 to 20 weight % and most preferably from 10 to 15 weight %. The mixture of solvents and cellulose ester is preferably stirred until cellulose ester is swelled sufficiently. The stirring time is preferably from 10 to 150 minutes and more preferably from 20 to 120 minutes. In the swelling process, there may be added components other than solvents and cellulose ester: a plasticizer, an anti-aging agent, a dye and a UV absorber.

Cooling Process

In a cooling process, the swelled mixture is cooled down to from −100 to −10° C. The cooling temperature is preferably a temperature at which the swelled mixture is solidified. The cooling speed is preferably not less than 1° C./min, more preferably not less than 2° C./min, further more preferably not less than 4° C./min, and most preferably not less than 8° C./min. The faster is the cooling speed, the better, however, around 100° C./sec is practical. Herein, the cooling speed is a value of the temperature difference between a temperature at start of cooling and a final cooling temperature divided by the time duration from start of cooling till reaching a final cooling temperature. In a cooling process, it is preferable to utilize a closed vessel to prevent contamination with water due to dewing at cooling. Further, the cooling time can be shortened under reduced pressure. It is preferable to use a pressure-resistant vessel to apply reduced pressure. Various methods or apparatuses are applicable as a concrete cooling mean.

For example, by transporting a swelled mixture with stirring through a cylindrical vessel while the cylinder is cooled from its surroundings, a swelled mixture can be cooled speedily and uniformly. For that purpose, preferably utilized is an apparatus comprised of a cylindrical vessel, a spiral transporting mechanism equipped in a vessel to transport a swelled mixture through the cylindrical vessel, and a cooling mechanism equipped at the surroundings of a vessel to cool a swelled mixture in the vessel. Further, solvents cooled down to from −105 to −15° C. may be added into a swelled mixture to perform cooling more speedily.

Further, a swelled mixture may be extruded as a string form having a diameter of from 0.1 to 20 mm into a liquid cooled at from −100 to −10° C. to enable a swelled mixture to be cooled still more speedily.

Heating Process

In a heating process, a swelled mixture which has been cooled is heated. The final temperature of a heating process is usually a room temperature. The heating speed is preferably not less than 1° C./min, more preferably not less than 2° C./min, further more preferably not less than 4° C./min and most preferably not less than 8° C./min. The faster is the heating speed, the better, however, around 100° C./sec is practical. Herein, the heating speed is a value of the temperature difference between a temperature at start of heating and a final heating temperature divided by the time duration from start of heating till reaching a final heating temperature. The heating time can be shortened by heating under an increased pressure. A pressure-resistant vessel is preferably utilized to perform increased pressure. Further, when dissolution is insufficient, the process from a cooling to heating process may be repeated. Whether dissolution is sufficient or not can be judged merely by visual observation of the appearance of the solution. Various methods or apparatus are applicable as a concrete heating mean.

For example, by transporting a swelled mixture with stirring through a cylindrical vessel while the cylinder is heated from its surroundings, a swelled mixture can be heated speedily and uniformly. For that purpose, preferably utilized is an apparatus comprised of a cylindrical vessel, a spiral transporting mechanism equipped in a vessel to transport a swelled mixture through the cylindrical vessel, and a heating mechanism equipped at the surroundings of a vessel to heat a swelled mixture in the vessel.

Further, a swelled mixture as a string form having a diameter of from 0.1 to 20 mm may be immersed into a liquid heated at from 0 to 55° C. to enable a swelled mixture to be heated still more speedily. In case of applying a method, in which a swelled mixture is extruded as a string form, in a cooling process, the string form swelled mixture may be immersed into a liquid for heating.

Further, a swelled mixture which has been cooled may be introduced through a cylindrical vessel, the flow of the swelled mixture being divided into plural flows of which direction is rotated within a vessel, and the swelled mixture can be heated from the surroundings of the vessel while repeating the division and rotation. A vessel equipped with partitions which causes division and rotation of substance, which is described above, is generally known as a static type mixer. In a typical static type mixer, Kenix™ Mixer, an element which divides a flow of substance into two flows and rotate them clockwise by 180 degrees and an element which divides a flow of substance into two flows and rotate them anti-clockwise by 180 degrees are arranged in a vessel one after another while being shifted by 90 degrees each other. Furthermore, a swelled mixture may be heated to a temperature of not less than the boiling point of the solvent under a pressure that is controlled to prevent the solvent from boiling. The temperature is determined depending on the kind of a solvent, and is generally from 60 to 200° C. The pressure is determined by the relationship between the temperature and the boiling point of the solvent.

Treatment After Solution Preparation

The solution prepared can be subjected to treatments such as concentration adjustment (concentration or dilution), filtration, temperature adjustment and component addition, when necessary. Adding components are determined depending on the purpose of a cellulose ester film. Typical additives are a plasticizer, an anti-degradation agent, a dye and a UV-absorbent described above.

A dope thus obtained can be subjected to base film production (casting of base) by a method called as solution casting method.

In the method, a dope (cellulose ester solution) is cast through a pressure die onto a metal support for casting (hereinafter, may be simply referred as a metal support), such as an endless metal belt being transported infinitely (for example, a stainless steel belt) or a rotating metal drum (for example, cast iron with a chromium plated surface), and the web (a dope film) is peeled off from the support and dried to prepare a base film.

In the invention, a film obtained by being peeled off within 60 seconds after casting and dried while a tension being provided is specifically preferred because cracks are hardly generated in a metal oxide layer formed on the film.

Organic solvents utilized to prepare these dopes in the invention are solvents containing essentially no chlorine type solvents, preferably being able to dissolve cellulose ester, and have an appropriate boiling point. They include, for example, such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 1,3-dimethyl-2-imidazolidinone and methyl acetoacetate, and preferable organic solvents (that is good solvents) include such as dioxolane derivatives, methyl acetate, ethyl acetate, methyl acetoacetate and acetone.

A peel off tension when a web is peeled off from a metal support for casting is preferably not more than 300 N/m, and a transport tension is preferably not more than 300 N/m, more preferably not more than 250 N/m and still more preferably from 100 to 200 N/m.

In a drying process of the invention, a web, after being peeled off from a metal support, is preferably dried while being provided with tension in a width or longitudinal direction so that an optical film having a metal oxide layer is superior in durability. To provide tension in a width or longitudinal direction means also an biaxial stretching method in which tension is provided not in one direction but in both of a width and a longitudinal directions. In the invention, preferred is a biaxial stretching method.

A stretching magnification of cellulose ester by a tenter is preferably from 1.01 to 1.5 times. A residual solvent amount at stretching is preferably from 3 to 30 weight %. Thereby, durability of a metal oxide layer is also further improved.

In the invention, a residual solvent amount is defined according to the following equation:

Residual solvent amount (%)=[(weight of web before heat treatment−weight of web after heat treatment)/(weight of web after heat treatment)]×100

Herein, heat treatment to measure a residual solvent amount was performed at 115° C. for 1 hour.

A cellulose ester film of the invention preferably contains a plasticizer. The plasticizer is not specifically limited and includes a phosphate ester type plasticizer, a phthalate ester type plasticizer, a trimellitate ester type plasticizer, a pyromellitate ester type plasticizer, a glycolate type plasticizer, a citrate ester type plasticizer, a polyester type plasticizer, etc.

A phosphoric ester type includes, for example, such as triphenyl phosphate, tricresyl phosphate, cresyl phenyl phosphate, octyl diphenyl phosphate, diphenyl biphenyl phosphate, trioctyl phosphate and tributyl phosphate. A phthalic ester type includes, for example, such as diethyl phthalate, dimethoxyethyl phthalate, dimethyl phthalate, dioctyl phthalate, dibutyl phthalate, di-2-ethylhexyl phthalate, butyl benzyl phthalate and cyclohexyl phthalate. A trimellitic ester type plasticizer includes, for example, such as tributyl trimellitate, triphenyl trimellitate and triethyl trimellitate. A pyromellitic ester type plasticizer includes, for example, such as tetrabutyl pyromellitate, tetraphenyl pyromellitate and tetraethyl pyromellitate. A glycerin ester includes, for example, such as triacetin and tributyrin. A glycolate ester type includes, for example, such as ethylphthalylethyl glycolate, methylphthalylethyl glycolate and butylphthalylbutyl glycolate. Other examples of a carboxylic ester type includes polyalcohol esters such as butyl oleinate, methylacetyl ricinolate, dibutyl sebacinate, various kinds of trimellitate esters and trimethylolpropane tribenzoate. Among these, preferable are a phosphate ester type plasticizer and a glycolate ester type plasticizer.

These plasticizers are preferably utilized alone or in combinations. Further, the amount of a plasticizer is preferably from 1 to 30 weight % based on cellulose ester, in respect to such as performance and processing of the film.

A UV absorbent is preferably included in a cellulose ester film of the invention in respect to preventing a film from degradation when it is placed outdoors as an image display device. Preferably utilized as a UV absorbent is one having superior absorbing ability of UV ray at wavelengths of not longer than 370 nm and small absorption of visible light at wavelengths of not shorter than 400 nm.

For example, oxybenzophenone type compounds, benzotriazol type compounds, salicylate ester type compounds, benzophenone type compounds, cyanoacrylate type compounds, nickel complex salt type compounds and triazine type compounds are included, however, the invention is not limited thereto.

A benzotriazole type UV absorbent includes, for example, such as 2-(2'-hydroxy-5'-methylphenyl) benzotriazole, 2-(2'-hydroxy-3',5'-di-tert-butylphenyl) benzotriazole, 2-(2'-hydroxy-3'-di-tert-butyl-5'-methylphenyl) benzotriazole, 2-(2'-hydroxy-3'5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2-2'-methylenebis(4-(1,1,3,3-tetramethylbutyl)-6-(2H-benzotriazole-2-ile) phenol), 2-(2'-hydroxy-3'-tert-butyl-5'-methylphenyl)-5-chlorobenzotriazole, 2-(2H-benzotriazole-2-ile)-6-(straight chain and side chain dodecyl)-4-methylphenol, octyl-3-[3-tert-butyl-4-hydroxy-5-(chloro-2H-benzotrizole-2-ile) phenyl] propionate and 2-ethylhexyl-3-[3-tert-butyl-4-hydroxy-5-(5-chloro-2H-benzotriazole-2-ile) phenyl] propionate; and TINUVIN 109, TINUVIN 171 and TINUVIN 326 (manufactured by Ciba Specialty Chemicals Co.) which are available on the market can be preferably used.

Further, a benzophenone type UV absorbent is also one of useful UV absorbents for a cellulose ester film of the invention.

For example, such as 2,4-dihydroxybenzophenone, 2,2'-dihydroxy-4-methoxybenzophenone, 2-hydroxy-4-methoxy-5-sulfobenzophenone and bis(2-methoxy-4-hydroxy-5-benzoylphenylmethan) are included.

In an optical film of the invention, a benzotriazole type UV absorbent or a benzophenone type UV absorbent, which are highly transparent and have a superior effect of preventing a polarizing plate or a liquid crystal from degradation, are preferably used; and among them a benzotriazole type UV absorbent having lower unnecessary coloring is specifically preferred. Further, preferable is a UV absorbent which hardly bleeds out or evaporates in a casting process.

Further, as more preferable additives such as a plasticizer or a UV absorbent utilized in the invention, from 0.5 to 30 weight % of additives having not less than three of an aromatic ring, a cycloalkyl ring or a cycloalkenyl ring in a molecule are preferably contained, and specifically preferable is a non-phosphoric acid type additive having not less than three rings selected from a benzene ring, a cyclohexane ring and a cyclohexene ring in a molecule. Further, these rings may be provided with a substituent.

In a web containing a plasticizer, which is a non-phosphoric acid type additive having not less than three rings selected from a benzene ring, a cyclohexane ring and a cyclohexene ring in a molecule, it is considered that minimal migration of a plasticizer from the inside to the surface may occur during drying of the web not to be concentrated on the surface so that there hardly remains local stress in a cellulose ester film prepared by being dried while tension is applied.

A cellulose ester film, which contains a non-phosphoric acid type additive having not less than three rings selected from a benzene ring, a cyclohexane ring and a cyclohexene ring in a molecule, can improve water vapor permeability and enhance stability at high temperature and humidity.

A non-phosphoric acid type additive having not less than three rings selected from a benzene ring, a cyclohexane ring and a cyclohexene ring in a molecule may contain not less than three of only benzene rings, of only cyclohexane rings, of only cyclohexene rings, and the rings may be condensed rings thereof or may contain rings condensed with heterocyclic rings.

In the invention, the number of rings means individual rings of a benzene ring, a cyclohexane ring or a cyclohexene ring contained in a condensed ring. For example, a naphthalene ring counts two. The rings may contain a substituent. In the invention, the number of the rings is preferably from 3 to 20, and more preferably from 3 to 10.

An additive having not less than three rings selected from a benzene ring, a cyclohexane ring and a cyclohexene ring in a molecule more preferably utilized in the invention includes the following:

P-43: dibenzyl phthalate
P-44: dibenzyl isophthalate
P-45: dibenzyl terephthalate
P-46: diphenyl phthalate
P-47: diphenyl isophthalate
P-48: diphenyl terephthalate
P-49: dicyclohexyl phthalate
P-50: dicyclohexyl isophthalate
P-51: dicyclohexyl terephthalate
P-52: phenylcyclohexyl isophthalate
P-53: phenylcyclohexyl terephthalate
P-54: phenylcyclohexyl phthalate
P-55: benzylcyclohexyl phthalate
P-56: benzylcyclohexyl terephthalate
P-57: benzylcyclohexyl isophthalate
P-58: dibenzylcyclohexane diacetate
P-59: 1,3-cyclohexane dimethyldibenzoate
P-60: 1,3-dibenzylcyclohexane dicarboxylate
P-61: 1,2-dibenzyl teteradehydrophthalate
P-62: 1,2-dicyclohexyl teterahydrophthalate
P-63: 1,3-cyclohexylcyclohexyl dicarboxylate
P-64: glycerin tribenzoate
P-65: glycerin triphenylacetate
P-66: tribenzylacetyl acetylcitrate
P-67: tricyclohexyl citrate
P-68: methyl abietate
P-69: ethyl abietate
P-70: butyl abietate
P-71: methyl dehydroabietate
P-72: butyl dehydroabietate
P-73: methyl parastriate etc., and low molecular weight polymers as oligomers preferably include resin oligomers such as P-74: KE-604 (manufactured by Arakawa Kagaku Co.)
P-75: KE-85 (manufactured by Arakawa Kagaku Co.)
P-76: Araldite EPN1139 (manufactured by Asahi Ciba Co., Ltd.)
P-77: Araldite GY260 (manufactured by Asahi Ciba Co., Ltd.)
P-78: Hilac 110H (manufactured by Hitachi Kasei Co., Ltd.)
P-79: Hilac 111 (manufactured by Hitachi Kasei Co., Ltd.)

however, the invention is not limited thereto, and other compounds described in the detailed description or in the examples, can be preferably used.

Further, additives described below is included.

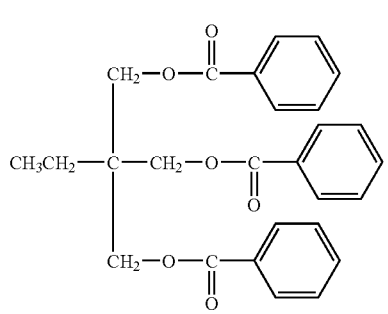

E-1

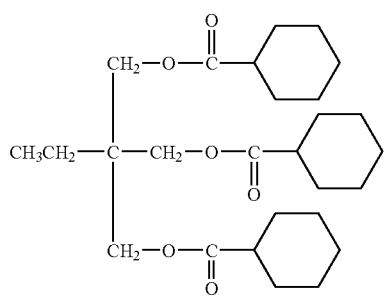

E-2

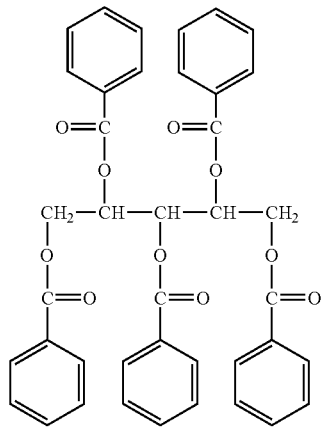

E-3

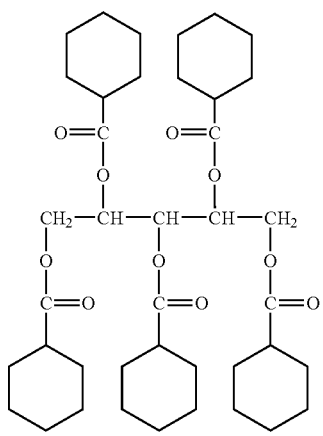

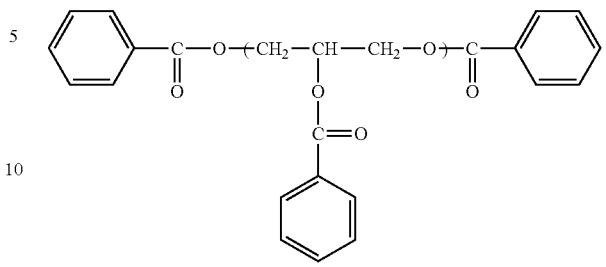
E-4

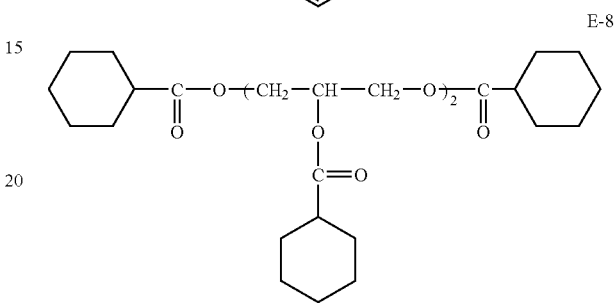
E-7

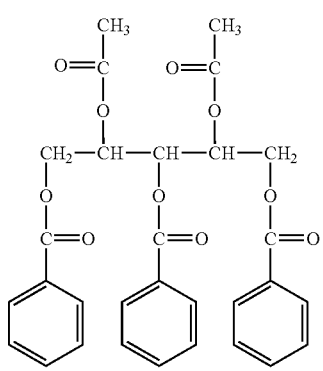

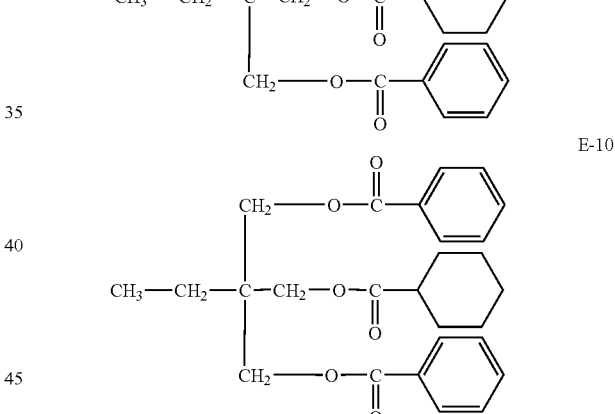
E-8

E-5

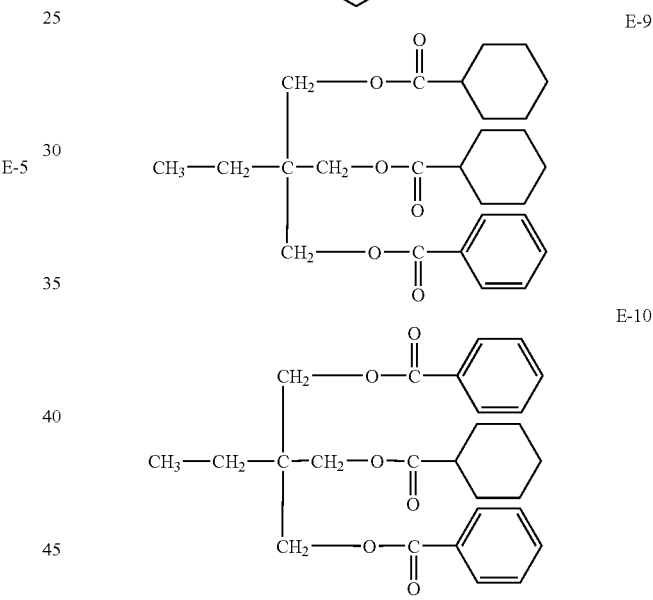
E-9

E-10

E-11

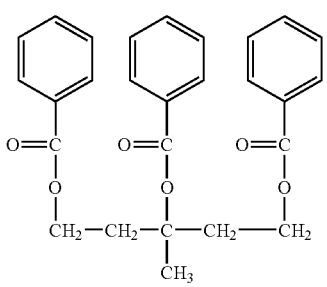
E-6

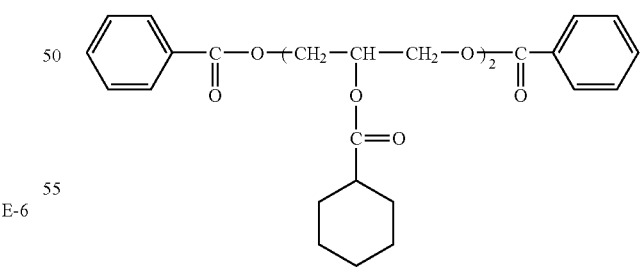

These additives are preferably contained at an amount of from 0.2 to 30 weight % and preferably from 1 to 20 weight %, based on a cellulose ester film.

In the invention, fine particles are preferably incorporated to control a kinetic friction coefficient of a cellulose ester film.

Fine particles include inorganic fine particles, for example, such as silicon dioxide, titanium dioxide, aluminum oxide, zirconium oxide, calcium carbonate, kaolin, talc, calcined calcium silicate, hydrated calcium silicate, aluminum silicate, magnesium silicate and calcium phosphate; polymethacrylic methyl acrylate resin powder, acrylstyrene type resin powder, polymethylmethacrylate resin powder, silicone type resin powder, polystyrene type resin powder, polycarbonate resin powder, benzoguanamine type resin powder, melamine type resin powder, polyolefin type resin powder, polyester type resin powder, polyamide type resin powder, polyimide type resin powder or polyfluoroethylene type resin powder; and specifically preferable are cross-linked polymer fine particles. The invention is not limited thereto.

Among these, silicon dioxide is specifically preferred to control kinetic friction coefficient and to be able to minimize haze of a film. A mean particle diameter of a primary particle or secondary particle of the fine particles is preferably within a range of from 0.01 to 1.0 µm, and the content is preferably from 0.005 to 0.5 weight % based on a cellulose ester film. Silicon dioxide has been often subjected to a surface treatment with an organic substance, which is preferable because haze of a film can be reduced.

Preferable organic substance for a surface treatment includes such as a halosilane series, an alkoxysilane series, a silazane and siloxane.

Since the effect on a sliding property is large when a mean particle diameter of fine particles is large, and on the contrary, transparency is superior when a mean particle diameter of fine particles is small, a mean diameter of a primary particle of fine particles is preferably not more than 20 nm, more preferably from 5 to 16 nm and specifically preferably from 5 to 12 nm. It is preferable to form roughness of 0.01 to 1.0 µm on the surface of a cellulose ester film by adding these fine particles in a cellulose ester film.

Silicon dioxide fine particles include such as AEROSIL 200, 200V, 300, R972, R972V, R974, R201, R812, OX50 and TT600 manufactured by Nippon Aerosil Co., Ltd., and preferable are AEROSIL 200V, R972, R972V, R974, R202 and R812.

These fine particles may be used in combinations of two or more kinds. Any mixing ratio can be applied when being used in combinations of two or more kinds.

In this case, fine particles of different mean particle diameters or materials, for example, AEROSIL 200V and R972 in a range of from 0.1/99.9 to 99.9/0.1 based on a weight ratio can be utilized. As zirconium oxide, for example, products available on the market such as AEROSIL 976 or R811 (manufactured by Nippon Aerosil Co., Ltd.) can be utilized.

As an organic fine particles, for example, silicone resins such as TOSPERL 103, 105, 108, 120, 145, 3120 and 240 (manufactured by Toshiba Silicone Co., Ltd.) available on the market can be also utilized.

In the invention, the measurement of a primary mean particle diameter of fine particles is performed by observing 100 particles through a transparent type electron microscope (at a magnification of from 500,000 to 2,000,000 times) and averaging the measured values to determine a primary mean particle diameter.

An apparent specific gravity of fine particles is preferably not less than 70 g/l, more preferably from 90 to 200 g/l and specifically preferably from 100 to 200 g/l. The larger the apparent specific gravity the higher concentration of dispersion solution can be prepared, which is preferable because of depressed haze and few coagula, and it is specifically preferred in such a case as the invention where a dope having a high solid concentration is prepared.

Silicon dioxide fine particles having a mean primary particle diameter of not more than 20 nm and an apparent specific gravity of not less than 70 g/l can be prepared, for example, by burning a mixture of vaporized silicon tetrachloride and hydrogen in the air at from 1,000 to 1,200° C. In the invention, to determine an apparent specific gravity described above, a given amount of silicon dioxide fine particles were taken up in a measuring cylinder, the weight was measured and calculation was performed according to the following equation:

Apparent specific gravity (g/l)=weight of silicon dioxide (g)/volume of silicon dioxide (l)

A method to prepare a dispersion solution of fine particles and a method to add the solution to a dope in the invention, for example, include three methods described below.

(Preparation Method A)

After organic solvents and fine particles are mixed with stirring, dispersion is performed by a dispersing device to prepare a dispersion solution of fine particles. The dispersion solution of fine particles is added to a dope solution and the system is stirred.

(Preparation Method B)

After organic solvents and fine particles are mixed with stirring, dispersion is performed by a dispersing device to prepare a dispersion solution of fine particles. The dispersion solution of fine particles is added and stirred to a solution in which a small amount of cellulose ester is added and dissolved with stirring in organic solvents separately prepared to obtain an additive solution of fine particles. This solution is mixed sufficiently with a dope solution by use of an in-line mixer.

(Preparation Method C)

A small amount of cellulose ester is added to organic solvents and dissolved with stirring. Fine particles are added thereto and dispersion is performed by a dispersing device to prepare an additive solution of fine particles. The additive solution of fine particles is mixed with a dope solution sufficiently by use of an in-line mixer.

Preparation method A is superior in respect to dispersibility of silicon dioxide fine particles, and preparation method C is superior in respect to re-coagulation of silicon dioxide fine particles being hardly occur. Among them, preparation method B described above is a preferable preparation method since it is superior in both of dispersibility of silicone dioxide fine particles and re-coagulation of silicon dioxide fine particles hardly being occured.

(Dispersion Method)

A concentration of silicon dioxide, when silicon dioxide fine particles are dispersed by mixing with such as organic solvents, is preferably from 5 to 30 weight %, more preferably from 10 to 25 weight % and most preferably from 15 to 20 weight %.

An addition amount of silicon dioxide fine particles to cellulose ester is preferably from 0.01 to 0.5 weight parts, more preferably from 0.05 to 0.2 weight parts and most preferably from 0.08 to 0.12 weight parts, based on 100 weight parts of cellulose ester. The larger the addition amount the more superior in a kinetic friction coefficient of a cellulose ester film, and the smaller the addition amount the more superior in respect to low haze as well as few coagula.

An organic solvent utilized for a dispersion solution is preferably lower alcohols and as lower alcohols included are methanol, ethanol, propyl alcohol, isopropyl alcohol, butanol, etc., which can be preferably used. An organic solvent other than lower alcohols is not specifically limited and preferably an organic solvent utilized at preparation of a dope. For example, such as methyl acetate, ethyl acetate, acetone and methyl acetoacetate are utilized in preparation of a dope.

As a dispersing device can be utilized an ordinary dispersing device. A dispersing device can be classified into a media dispersing device and a media-less dispersing device. For the purpose of dispersion of silicon dioxide fine particles is preferred the latter because haze is lowered.

A media dispersing device includes such as a ball mill, a sand mill and a dynomill.

Further, a media-less dispersing device includes such as an ultra-sonic type, a centrifugal type and a high pressure type of which a high pressure type is preferable in the invention, and a high pressure dispersing device is preferred.

A high pressure dispersing device is a device which provides specific conditions such as a high share or a high pressure state by sending a mixture composition of fine particles and organic solvents through a fine tube at a high speed. When a treatment by use of a high pressure dispersing device is performed, it is preferred that a maximum pressure condition in the device is preferably not less than 9.8 MPa, for example, at a fine tube having a diameter of from 1 to 2,000 μm. Furthermore preferable is a pressure not less than 19.6 Mpa. In the case, the maximum speed preferably reaches not less than 100 m/sec, and heat conducting speed preferably reaches not less than 420 kJ/hour.

High pressure dispersing devices such as described above include a high pressure homogenizer (product name: MICROFLUIDIZER produced by Microfluides Corporation or NANOMIZER produced by Nanomizer Co. and also include a MANTON-GAULIN type high pressure dispersing device such as, for example, a homogenizer produced by Izumi Food Machinery and UHN-01 produced by Sanwa Kikai Co., Ltd.

In the invention, when fine particles described above are incorporated, they are preferably distributed uniformly with respect to a thickness direction of a cellulose ester film, more preferably distributed so as to be present mainly in the vicinity of the surface, and two or more kinds of dopes are simultaneously cast, for example, by a co-casting method using one die, so that a dope containing fine particles is arranged on the surface side. Thereby, haze is decreased and a kinetic friction coefficient is also lowered. It is still more preferable to arrange a dope containing fine particles at one or both of the surface side layers, by using three kinds of dopes.

To control a kinetic friction coefficient of a cellulose ester film of the invention, a back-coating layer containing fine particles is also preferably provided on the backside of the film, and a kinetic friction coefficient can be controlled by changing such as the size, addition amount and material of fine particles.

Fine particles useful for incorporation in a back-coating layer of the invention include fine particles of an inorganic compound or an organic compounds, and such as a kind of fine particles, a particle diameter thereof, an apparent specific gravity thereof and a dispersing method thereof are almost similar to those in the case of fine particles incorporated in a cellulose ester film described above.

Addition amount of fine particles to a binder of a back-coating layer is preferably from 0.01 to 1 weight parts, more preferably from 0.05 to 0.5 weight parts and most preferably 0.08 to 0.2 weight parts, based on 100 parts of the resin. The more the addition amount the smaller is a kinetic friction coefficient, and the less the addition amount the lower is haze as well as the fewer is coagula.

Organic solvents utilized in a back-coating layer are not specifically limited, however, organic solvents which dissolve a cellulose ester film and a raw material resin thereof are useful because they provide an anti-curl function to a back-coating layer. They may be selected according to a curl degree, a kind of resin, a mixing ratio and a coating amount and the like, of a cellulose ester film.

Organic solvents which can be utilized in a back-coating layer include, for example, such as benzene, toluene, xylene, dioxane, acetone, methyl ethyl ketone, N,N-dimethyl formamide, methyl acetate, ethyl acetate, trichloroethylene, methylene chloride, ethylene chloride, tetrachloroethane, trichloroethane, chloroform, or N-methyl pyrrolidone and 1,3-dimethyl-2-imidazolidine.

Organic solvents which do not dissolve cellulose ester include, for example, methanol, ethanol, n-propyl alcohol, i-propyl alcohol, n-butanol, etc., however organic solvents are not limited thereto.

As a coating method for a coating composition of a back-coating layer, it is preferable to make a coating solution thickness (also referred as a wet thickness) from 1 to 100 μm and specifically preferable from 5 to 30 μm, by use of such as a gravure coater, a dip coater, a wire-bar coater, a reverse coater and an extrusion coater.

Resins utilized in a back-coating layer include, for example, vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, a ethylene/vinyl alcohol copolymer, a chlorinated polyvinylchloride, an ethylene/vinyl chloride copolymer and a ethylene/vinyl acetate copolymer; cellulose ester type resins such as cellulose nitrate, cellulose acetate propionate, cellulose diacetate, cellulose triacetate, cellulose acetate phthalate and cellulose acetate butylate; rubber type resins such as a copolymer of maleic acid and/or acrylic acid, a copolymer of acrylate ester, an acrylonitrile/styrene copolymer, a chlorinated polyethylene, an acrylonitrile/chlorinated polyethylene/stylene copolymer, a methyl methacrylate/butadiene/styrene copolymer, an acryl resin, a polyvinylacetal resin, a polyvinylbutyral resin, a polyester polyurethane resin, a polyether polyurethane resin, a polycarbonate polyurethane resin, a polyester resin, a polyether resin, a polyamide resin, an amino resin, a styrene/butadiene resin and a butadiene/acrylonitrile resin; a silicone type resin, a fluorine-containig type resin, polymethyl methacrylate, a copolymer of polymethylmethacrylate and polymethylacrylate; however, the invention is not limited thereto. Specifically preferable are cellulose type resins such as cellulose diacetate and cellulose acetate butyrate.

A kinetic friction coefficient can be made to be not more than 0.9 by providing the foregoing back-coating layer.

An optical film of the invention is characterized by that a metal oxide layer is provided on a cellulose ester film directly or through other intervening layers, however more preferably it is formed intervening a cured resin layer or other layers.

A cured resin layer may be provided with various functions, and may be, for example, an anti-glare layer or a clear hard coat layer. A cured resin layer is preferably prepared by polymerizing a composition containing one or more kinds of ethylenically unsaturated monomers.

As a resin layer which is formed by polymerizing a composition containing ethylenically unsaturated monomers, preferably utilized is a layer formed by curing an actinic ray curable resin or heat curable resin, and specifically more preferably an actinic ray curable resin.

Herein, an actinic ray curable resin layer refers to a layer comprised of a resin, which cures through such as a cross-linking reaction by actinic ray irradiation of UV ray or electron beam, as a main component.

An actinic ray curable resin includes a UV curable resin and an electron beam curable resin as typical examples, however, may also be a resin which cures by actinic ray irradiation other than UV and electron beam.

A UV curable resin includes, for example, such as a UV curable acryl urethane type resin, a UV curable polyester acrylate type resin, a UV curable epoxy acrylate type resin, a UV curable polyol acrylate type resin or a UV curable epoxy type resin.

Concrete examples, for example, include such as trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

A UV curable acryl urethane type resin includes generally those prepared easily by further reacting a acrylate type monomer having a hydroxy group such as 2-hydroxyethyl acrylate, 2-hydroxyethyl methacrylate (hereinafter, only acrylate will be described as including also methacrylate) and 2-hydroxypropyl acrylate with a product, which is prepared by reacting an isocyanate monomer or prepolymer to a polyester polyol, and can be utilized those described in JP-A 59-151110.

A UV curable polyester acrylate type resin includes generally those prepared easily by reacting a 2-hydroxyethyl acrylate or a 2-hydroxy acrylate type monomer with a polyester polyol, and can be utilized those described in JP-A 59-151112.

Concrete examples of a UV curable epoxy acrylate type resin include a product which is prepared by adding a reactive diluent and a photoreaction initiator to epoxy acrylate as an oligomer and reacting them, and can be utilized those described in JP-A 1-105738.

The photoreaction initiator includes concretely such as benzoine and its derivative, acetophenone, benzophenone, hydroxy benzophenone, Michler's ketone, α-amyloxim ester and thioxanthone. They may be utilized together with a photo sensitizer.

The photoreaction initiator described above can be utilized also as a photo sensitizer. Further, sensitizers such as n-butyl amine, triethyl amine and tri-n-butyl phosphine can be utilized when an epoxy acrylate type photoreaction agent is used.

A resin monomer, for example, include usual monomers, as a monomer having one unsaturated double bond, such as methyl acrylate, ethyl acrylate, butyl acrylate, benzyl acrylate, cyclohexyl acrylate, vinyl acetate and styrene. And as a monomer having two or more unsaturated double bonds are included ethyleneglycol diacrylate, propyleneglycol diacrylate, divinyl benzene, 1,4-cyclohexyane diacrylate, 1,4-cyclohexyldimethyl diacrylate; and the foregoing trimethylolpropane triacrylate and pentaerythritol tetraacrylate ester.

Products available on the market as a UV curable resin which can be utilized in the invention may be suitably selected from Adekaoptomer KR, BY Series: KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Aurex No. 340 Clear (manufactured by Chyugoku Toryo Co., Ltd.); Sunrad H-601 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

These actinic ray curable resin layers can be coated by a method well known in the art. As a light source to form a cured layer from a UV curable resin by photo-curing reaction, there is no limitation for use as far as a light source generates UV ray. For example, such as a law-pressure mercury lamp, a medium-pressure mercury lamp, a high-pressure mercury lamp, an ultrahigh-pressure mercury lamp, a carbon arc lamp, a metal halide lamp and a xenon lamp can be utilized. The irradiation conditions may change depending on each lamps, however, an irradiation quantity of light is preferably approximately from 20 to 10,000 $mJ/cm^2$ and more preferably from 50 to 2,000 $mJ/cm^2$. A cured layer, when it is formed at a range from near UV to visible light, can be efficiently formed by use of a sensitizer having the maximum absorption within a range thereof.

As organic solvents for a coating solution of a UV curable resin layer composition, can be utilized, for example, a solvent suitably selected from a hydrocarbon series, an alcohol series, a ketone series, a ester series, a glycol ether series and other organic solvents, or combinations thereof. It is preferred to utilize an organic solvent described above containing not less than 5 weight % of and more preferably from 5 to 80 weight % of such as propyleneglycol monoalkylether (having 1 to 4 carbon atoms of an alkyl group) or propyleneglycol monoalkylether acetate ester (having 1 to 4 carbon atoms of an alkyl group).

As a coating method for a coating solution of UV curable resin composition can be utilized the methods described above. A coating amount is suitably from 0.1 to 30 μm and preferably from 0.5 to 15 μm, as a wet layer thickness.

A UV curable resin composition is preferably irradiated by UV ray during or after coating and drying. The irradiation time is preferably from 0.5 seconds to 5 minutes and more preferably from 3 seconds to 2 minutes in respect to efficient curing or operation efficiency.

To a cured resin layer thus obtained, may be added fine particles made of an inorganic or organic compound to prevent blocking, to enhance abrasion resistance or to provide anti-glare property, and the kind is almost similar to the fine particles of a matting agent described above.

A mean particle diameter of the fine particles is preferably from 0.005 to 5 μm and specifically preferably from 0.01 to 1 μm.

The ratio of fine particle powder to a UV curable resin composition is preferably from 0.1 to 10 weight parts based on 100 weight parts of a resin composition.

A UV curable resin layer may be a clear hard coating layer having a mean center-line roughness (Ra) of from 1 to 50 nm or a anti-glare layer having a Ra of from 0.1 to 1 μm.

In the invention, a metal oxide thin layer can be formed on these layers.

Metal Oxide Thin Layer

In the invention, a method to provide a metal oxide layer is not specifically limited and the layer can be formed by coating, sputtering, evaporation and CVD (Chemical Vapor Deposition) methods.

A method to form a metal oxide layer by coating includes such as a method in which metal oxide powder is dispersed in a binder resin having been dissolved in solvents, coated and dried; a method in which a polymer having a cross-linking structure is utilized as a binder resin; and a method in which an ethylenically unsaturated monomer and a photopolymerization initiator being included in a system, which is irradiated by actinic ray to form a layer.

In the invention, it is indispensable to form a metal oxide layer on a cellulose ester film or on a cellulose ester film provided with such as a hard coat layer. It is preferable for decreasing the reflectance to form a metal oxide layer having a law refractive index as the top layer on a cellulose ester film and to form a high refractive index layer between them, or to further provide a medium refractive index layer (by changing an amount of a metal oxide or kind of a metal) between a cellulose ester film and a high refractive index layer. A refractive index of a high refractive index layer is preferably from 1.55 to 2.30 and more preferably from 1.57 to 2.20. A refractive index of a medium refractive index layer is controlled so as to be an intermediate value between a refractive index of a cellulose ester film and that of a high refractive index layer. A refractive index of a medium refractive index layer is preferably from 1.55 to 1.80. A thickness of a metal oxide layer is preferably from 5 nm to 100 µm, more preferably from 10 nm to 10 µm and most preferably from 30 nm to 1 µm. A haze of a metal oxide layer is preferably not more than 5%, more preferably not more than 3% and most preferably not more than 1%. A strength of a metal oxide layer is preferably not less than H, more preferably not less than 2H and most preferably not less than 3H, based on a pencil hardness at a weight of 1 kg. In case of a metal oxide layer being formed by coating, inorganic fine particles and a binder polymer are preferably incorporated therein.

Fine particles utilized in a metal oxide layer and a medium refractive index layer preferably have a refractive index of from 1.80 to 2.80 and more preferably from 1.90 to 2.80. A weight average diameter of a primary particle of inorganic fine particles is preferably from 1 to 150 nm, more preferably from 1 to 100 nm and most preferably from 1 to 80 nm. A weight average diameter of inorganic fine particles in a layer is preferably from 1 to 200 nm, more preferably from 5 to 150 nm, furthermore preferably from 10 to 100 nm and most preferably from 10 to 80 nm. A mean particle diameter is measured by a light scattering method when it is not smaller than from 20 to 30 nm, and by electron micrograph when it is not larger than from 20 to 30 nm. A specific surface area of inorganic fine particles is preferably from 10 to 400 $m^2/g$, more preferably from 20 to 200 $m^2/g$ and most preferably from 30 to 150 $m^2/g$, as a value measured by BET method.

Inorganic fine particles are particles comprised of an oxide of a metal. Examples of an oxide or sulfide of a metal include such as titanium dioxide (e.g. rutile, mixed crystal of rutile/anatase, anatase, amorphous structure), tin oxide, indium oxide, zinc oxide and zirconium oxide. Among them, titanium dioxide, tin oxide and indium oxide are specifically preferred. Inorganic fine particles can include other elements in addition to these metal oxides which is a main component. A main component means a component of the largest content (weight %) which composes particles. Examples of other elements include Ti, Zr, Sn, Sb, Cu, Fe, Mn, Pb, Cd, As, Cr, Hg, Zn, Al, Mg, Si, P and S.

Inorganic fine particles may be surface treated. Surface treatment can be performed by use of an inorganic compound or an organic compound. Examples of an inorganic compound utilized for the surface treatment include alumina, silica, zirconium oxide and iron oxide. Among them, alumina and silica are preferred. Examples of an organic compound utilized for the surface treatment include polyol, alkanol amine, stearic acid, a silane coupling agent and a titanate coupling agent. Among them, a silane coupling agent is most preferable. The surface treatment may be performed in combinations of two or more kinds of surface treatment. The form of inorganic fine particles is preferably a rice shape, a spherical shape, a cubic shape, a cone shape or an irregular shape. Not less than two kinds of inorganic fine particles may be utilized in combinations in a metal oxide layer.

The ratio of inorganic fine particles in a metal oxide layer is preferably from 5 to 65 volume %, more preferably from 10 to 60 volume % and further more preferably from 20 to 55 volume %.

Inorganic fine particles are supplied to a coating solution for forming a metal oxide layer, as a dispersion state of being dispersed in a medium. As a dispersion medium for inorganic fine particles, preferably is utilized liquid having a boiling point of from 60 to 170° C. Concrete examples of a dispersion medium include water, alcohols (e.g. methanol, ethanol, isopropanol, butanol and benzyl alcohol), ketones (e.g. acetone, methyl ethyl ketone, methyl isobutyl ketone and cyclohexanone), esters (e.g. methyl acetate, ethyl acetate, propyl acetate, butyl acetate, methyl formate, ethyl formate, propyl formate and butyl formate), aliphatic hydrocarbons (e.g. hexane and cyclohexane), aromatic hydrocarbons (e.g. benzene, toluene and xylene), amides (e.g. dimethylformamide, dimethylacetoamide and n-methylpyrrolidone), ethers (e.g. diethyl ether, dioxane and tetrahydrofuran) and alkoxyalcohols (e.g. 1-methoxy-2-propanol). Among them, specifically preferable are toluene, xylene, methyl ethyl ketone, cyclohexanone and butanol.

Inorganic fine particles can be dispersed in a medium by use of a dispersing device. Examples of a dispersing device include a sand grinder mill (e.g. pin attached beads mill), a high-speed impeller mill, a pebble mill, a roller mill, an atliter and a colloidal mill. Specifically preferable are a sand grinder mill and a high-speed impeller mill. Further a preliminary dispersion treatment may be performed. Examples of a dispersion device for the preliminary dispersion treatment include a ball mill, a tree-rolls mill, a kneader and an extruder.

A metal oxide layer preferably utilizes a polymer having a cross-linking structure (hereinafter, may be also referred as "a cross-linking polymer") as a binder polymer. Examples of a cross-linking polymer include cross-linked products of such as, a polymer having a saturated hydrocarbon chain such as polyolefin (hereinafter, generically referred as "polyolefin"), polyether, polyurea, polyurethane, polyester, polyamine, polyamide and melamine resin. Among them, preferable are cross-linked products of polyolefin, of polyether and of polyurethane, more preferable are cross-linked products of polyolefin and of polyether and most preferable is a cross-linked product of polyolefin. Further, it is more preferable that a cross-linking polymer provided with an anionic group. An anionic group functions to maintain the dispersed state of inorganic fine particles and a cross-linking structure provides a polymer with film forming ability which functions to strengthen a film. The anionic group described above may be bonded directly or through a connecting group to a polymer chain, however, it is preferably bonded to a main chain as a side chain through a connecting group.

In the invention, a method of forming a metal oxide layer by means of plasma discharge treatment is specifically preferably utilized.

In what follows, a method of forming a metal oxide layer by means of plasma discharge treatment will be explained according to FIGS. 1 and 2.

Plasma discharge treatment in atmospheric pressure or in near atmospheric pressure, as a method for forming a metal oxide layer of the invention, is performed by utilizing such as the following plasma discharge apparatus.

FIG. 1 illustrates an example of a plasma discharge treatment apparatus being utilized for forming a metal oxide layer of the invention.

In FIG. 1, the apparatus is provided with a pair of rotating electrodes 10A and 10B, to one of which an electric source 80 which can apply voltage for generating plasma discharge is connected through a voltage supply device 81 and to another an earth is connected through 82 which is grounded.

Rotating electrodes 10A and 10B transport a cellulose ester film being rotated around them, and are preferably roll electrodes or belt-form electrodes. In FIG. 1, roll electrodes are illustrated.

The gap (electrode gap) of the roll electrodes is a place where electric discharge is performed, and is adjusted so that cellulose ester film F can be transported through. The gap between electrodes forms electric discharge portion 50.

The electrode gap is maintained under a pressure of atmospheric pressure or the vicinity and hereto reactive gas G is supplied from a reactive gas supply portion 30 to perform plasma discharge treatment on the surface of cellulose ester film F.

Herein, cellulose ester film F unwounded from a master roll or cellulose ester film F transported from a previous process is transported firstly while contacting rotating electrode 10A which is rotating in a transport direction and passes through electric discharge portion 50 to form a thin layer on the surface of cellulose ester film F.

Cellulose ester film F which once comes out of electric discharge portion 50 is U-turned by U-turn rolls 11A to 11D, next being transported while contacting rotating electrode 10B which is rotating in a opposite direction, and passes through again the aforementioned electric discharge portion 50 to form a thin layer by plasma discharge treatment further onto the surface of cellulose ester film having been provided with a thin layer previously. The U-turn is performed usually in approximately from 0.1 second to 1 minute.

Reactive gas G having been used for the treatment is evacuated through gas outlet 40 as exhausted gas G'. Reactive gas G is preferably supplied to electric discharge portion 50 by heating at a temperature from room temperature to 250° C., preferably from 50 to 150° C. and more preferably from 80 to 120° C.

Further, electric discharge portion 50 is preferably equipped with rectifying plate 51 in order to make the flow of reactive gas G and exhausted gas G' smooth as well as to control electric discharge portion 50 not to spread and generate unnecessary electric discharge between electrodes 10A and 10B, and rectifying plate 51 is preferably made of an insulating material.

A thin layer formed on cellulose ester film F is abbreviated in the figure. Cellulose ester film F having being provided with a thin layer on the surface thereof is transported to a direction toward a winding roll (not shown in the figure) or next process via guide roll 21.

Therefore, cellulose ester film F is plasma discharge treated while going and returning in electric discharge portion 50 being tightly contact with rotating rolls 10A and 10B.

Incidentally, although not shown in the figure, devices including such as rotating electrodes 10A and 10B, guide rolls 20 and 21, U-turn rolls 11A to 11D, reactive gas supply portion 30 and gas evacuation outlet 40 are preferably surrounded by and installed in a plasma discharge treatment vessel which shields devices from external field.

Further, although it is not shown in the figure, a temperature control medium for temperature control of rotating electrodes 10A and 10B is circulated when necessary and the surface temperature of each electrode is controlled to a prescribed value.

Figure 2:
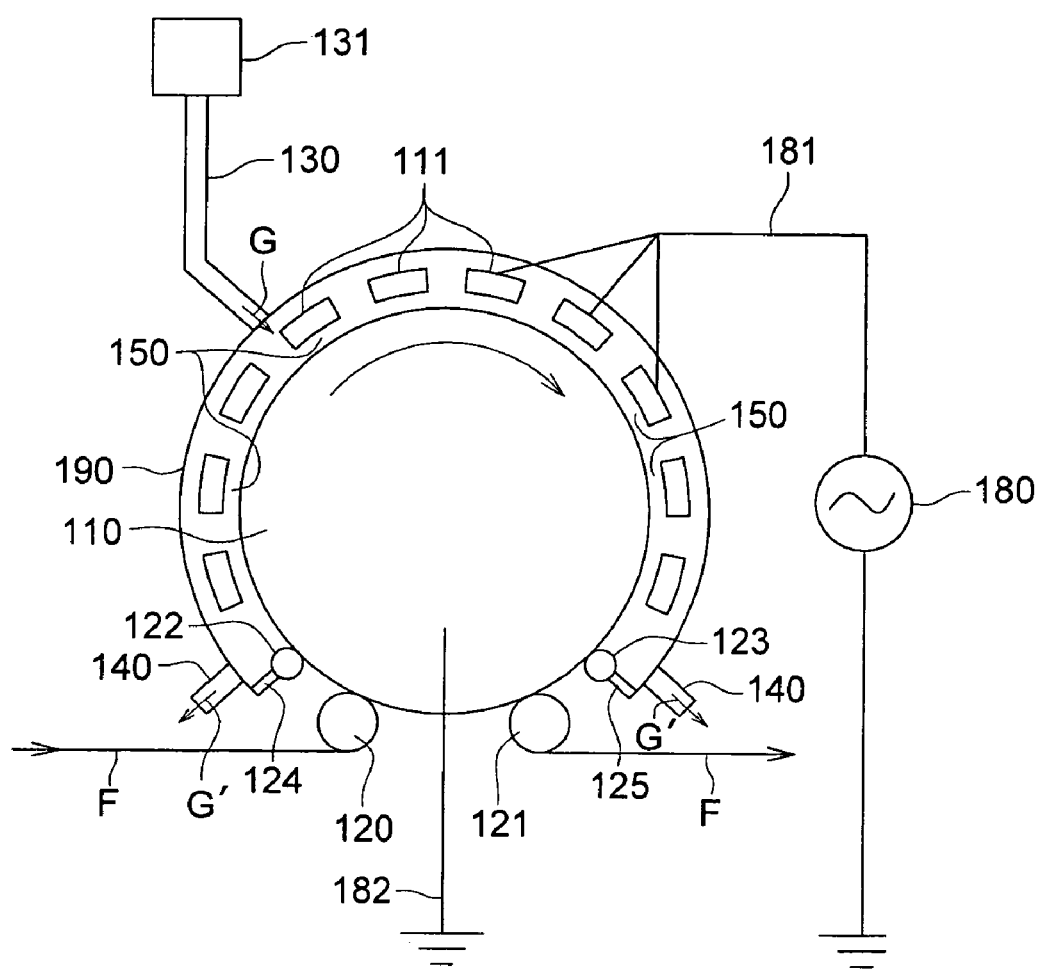
FIG. 2 is a schematic diagram illustrating an example of a plasma discharge treatment apparatus comprising a rotating electrode and fixed electrodes useful for forming a metal oxide thin layer of the invention.

FIG. 2 shows an example of a plasma discharge treatment apparatus equipped with a rotating electrode and fixed electrodes which are useful for forming a metal oxide thin layer of the invention.

A rotating electrode 110 and plural number of fixed electrodes 111 which are arranged to face thereto are provided; cellulose ester film F transported from a master roll or from a previous process, which are not shown in the figure, is guided to rotating electrode 110 through a guide roll 120 and a nip roll 122, being further transported in contact with rotating electrode 110 while being synchronized with the rotation of rotating electrode 110; and reactive gas G, which is prepared in reactive gas generator 131, is supplied from air supply tube 130 to electric discharge portion 150 placed under a pressure of atmospheric pressure or the vicinity to form a thin layer on the surface of a cellulose ester film which is facing to fixed electrodes 111.

Rotating electrode 110 and fixed electrodes are connected on the one hand with electric source 180 via voltage supply mean 181 and on the other to an earth via 182 which is grounded.

Further, rotating electrode 110, fixed electrodes 111 and electric discharge portion 150 are covered with plasma discharge treatment vessel 190 to be shielded against external field. Exhausted gas G' having been used is evacuated through gas outlet 140 which is placed at the bottom of a treatment chamber.

Cellulose ester film F which has been subjected to plasma discharge treatment is transported to next process or to a wind-up roll, which is not shown in the figure, via nip roll 123 and guide roll 121.

Partition plates 124 and 125 against external field are provided at the place of nip rolls 122 and 123 in the portions where cellulose ester film F comes into and goes out from a plasma discharge treatment vessel so as to shut out the air which comes in being accompanied with nip roller 122 and cellulose ester film F from external field and further so as to prevent reactive gas G or exhausted gas G' from escaping to external field at the outlet. Incidentally, although it is not shown in the figure, a medium with a controlled temperature for temperature control of rotating electrodes 110 and fixed electrodes 111 is circulated inside when necessary.

In this manner, in the invention, a cellulose ester film, on which a thin layer is formed, is preferably subjected to plasma discharge treatment while being transported on the rotating electrode.

The surface where a rotating electrode contact with a cellulose ester film is required to have high smoothness, and a surface roughness of the surface of a rotating electrode is preferably not more than 10 μm, more preferably not more than 8 μm and specifically preferably not more than 7 μm, based on the maximum height ($R_{max}$) of surface roughness defined by JIS-B-0601. Further, it is necessary to protect electrodes from dust or foreign matter to adhere for a uniform film preparation.

The surface of an electrode utilized in the invention is desirably covered with a solid dielectric, and specifically desirably covered with a solid dielectric with respect to electric conductive base materials such as a metal. A solid dielectric includes plastics such as polytetrafluoroethylene and polyethylene terephthalate; metal oxides such as glass, silicon dioxide, aluminum oxide ($Al_2O_3$), zirconium oxide ($ZrO_2$) and titanium dioxide ($TiO_2$); and double oxides such as barium titanate.

Specifically preferred is a ceramic covered dielectric which is pore sealing processed by use of an inorganic material after sputtering of a ceramic. Herein, electric conductive base materials such as a metal include metals such as silver, platinum, stainless steel, aluminum and iron, and among them preferable is stainless steel in respect to manufacturing.

Further, as a lining material, utilized are silicate type glass, borate type glass, phosphate type glass, germanate type glass, tellurite type glass, aluminate type glass and vanadate type glass, and among them more preferably utilized is borate type glass in respect to easy manufacturing.

In the invention, electrodes can be heated or cooled from the back side (inside), when necessary. In case of an electrode is a belt, it may be cooled by air from the back side, however, in case of a rotating electrode utilizing a roll, temperature of the surface of an electrode and of a cellulose ester film is preferably controlled by supplying a medium inside the electrode.

As a medium, utilized preferably are distilled water, oil, and specifically insulating materials such as silicone oil.

The temperature of a cellulose ester film at electric discharge treatment is preferably not higher than from room temperature to 200° C., more preferably not higher than from room temperature to 120° C. and more preferably from 50 to 110° C.

Further, significant curl may be generated such as because the temperature of the surface of a cellulose ester film is raised also by electric discharge, however, according to the invention, curl generation has been markedly reduced.

Temperature unevenness of the cellulose ester film surface specially in a width direction at electric discharge treatment is preferably minimized, and preferably depressed within not more than ±5° C., more preferably within not more than ±1° C. and specifically preferably within not more than ±0.1° C.

In the invention, the electrode gap distance is determined in consideration of such as thickness of a solid dielectric, supplied voltage and frequency, and a purpose of plasma application. The shortest distance between a solid dielectric and an electrode in case of providing one of the foregoing electrodes with a solid dielectric, or the distance between each other solid dielectrics in case of providing both of the foregoing electrodes with a solid dielectric, in either case, is preferably from 0.5 to 20 mm and specifically preferably 1±0.5 mm, in respect to generate uniform plasma discharge.

In the invention, at an electric discharge portion comprised of an electrode gap, a gas mixture generated in a gas generating device is introduced, with regulation of the flow rate from a reactive gas supply inlet to a plasma discharge portion. The concentration and flow rate of a reactive gas are adjusted suitably, and are preferably supplied at a sufficient rate against transportation speed of a cellulose ester film. It is preferable to set up a flow rate and electric discharge conditions so that almost all the reactive gas supplied is consumed to react and form a thin layer.

To prevent the atmosphere from invading into an electric discharge portion and a reactive gas from leaking out of the apparatus, it is preferable that electrodes and a cellulose ester film during transportation are covered as a whole to be shielded from an external field. In the invention, the pressure of an electric discharge portion is maintained at atmospheric pressure and the vicinity. Further, a reactive gas may produce metal fine particles of a metal oxide by being decomposed in air-phase, and it is preferred to set up a flow rate and electric discharge conditions so as to depress such production.

Herein, atmospheric pressure and the vicinity means a pressure from 20 to 200 kPa, and preferably from 93 to 110 kPa to suitably obtain the effects described in the invention.

The pressure at an electric discharge portion is preferably a slightly plus pressure against atmospheric pressure at outside of the apparatus, and more preferably atmospheric pressure +0.1 to +5 kPa.

In a plasma discharge treatment apparatus useful for the invention, it is preferable to generate stable plasma that one of electrodes is connected to an electric power source to be applied with voltage and the other electrode is grounded by connecting to an earth.

The voltage value applied by a high-frequency electric power source utilized in the invention is suitably determined; for example, a voltage is approximately from 0.5 to 10 kV, an applied frequency number is adjusted to from 1 kHz to 150 kHz and a wave shape may be of pulse-waves or sine-waves. Specifically preferable is to adjust the frequency number to over 100 kHz and not more than 50 MHz to obtain a preferable electric discharge portion (electric discharge space).

Electric discharge density at an electric discharge portion is preferably from 5 to 1,000 W·min/m$^2$ and specifically desirably from 50 to 500 W·min/m$^2$.

A plasma discharge treatment portion is desirably surrounded suitably by a treatment vessel made of PYREX glass (R), a metal vessel also can be used provided that against an electrode is assured. For example, polyimide resin may be pasted up on the inside surface of a stainless steel frame, or the metal frame may be subjected to ceramic spattering to keep insulation. Further, the side surface of an electric discharge portion and a rotating electrode and the side surface of a transportation portion of a cellulose ester film may be surrounded to enable suitably to supply a reactive gas to an electric discharge portion or to evacuate an exhausted gas from that.

A reactive gas utilized in a method for forming a metal oxide thin layer of the invention will be explained. A reactive gas for forming a thin layer preferably contains nitrogen or a rare gas.

That is, a reactive gas is preferably a gas mixture of nitrogen or a rare gas, and the reactive gas described below.

Herein, a rare gas is an element of 18 group of the periodic table, concretely, such as helium, neon, argon, xenon and radon, and among them preferably utilized in the invention are helium and argon. They may be used in combinations, and, for example, at a ratio of such as helium 3 to argon 7.

Concentration of a rare gas in a reactive gas is preferably not less than 90 volume % to generate stable plasma discharge, and desirably from 90 to 99.99 volume %.

A rare gas is utilized to generate stable plasma discharge, and a reactive gas being ionized or radicalized is accumulated or attached on the surface of a base material to form a thin layer.

As a reactive gas useful for the invention, a gas added with a reactive gas of various substances is utilized to enable thin layers having various functions to be formed on a cellulose ester film.

For example, by utilizing a fluorine-containing organic compound and a silicon compound as a reactive gas, a low refractive-index layer of an anti-reflection layer can be formed.

Further, by utilizing an organometallic compound, metal-hydrogen compound or metal halogenide, which includes Ti, Zr, In, Sn, Zn, Ge, Si or other metals, such as a metal oxide layer or a metal nitride layer can be formed, and these layers may function as a medium refractive index layer or a high refractive-index layer of an anti-reflection layer, as well as an electric conductive layer or an anti-static layer.

Further an anti-staining layer and a low refractive index layer can be formed by use of a fluorine-contained organic compound, and a gas-barrier layer and a low refractive index layer can be formed by use of a silicon compound. The invention is utilized specifically preferably for preparation of an anti-reflection layer which is formed by accumulating multi-layers of a high, medium refractive index layer and a low refractive index layer alternately.

The thickness of a metal oxide layer formed in the invention is preferably obtained in a range from 1 to 1,000 nm.

In atmospheric pressure plasma treatment, fluorine-contained compound including layer can also be formed by utilizing a fluorine-contained organic compound as a starting gas.

Fluorine-contained organic compounds are preferably such as a carbon fluoride gas and a hydrocarbon fluoride gas.

Concretely, fluorine-contained organic compounds include, for example, carbon fluoride compounds such as carbon tetrafluoride, carbon hexafluoride, tetrafluoroethylene, hexafluoropropyrene, octafluorocyclobutane; hydrocarbon fluoride compounds such as difluoromethane, tetrafluoroethane, tetrafluoropropyrene, trifluoropropyrene and octafluorocyclobutane; further, halogenides of a hydrocarbon fluoride compound such as monochlorotrifluoromethane, monochlorodifluoromethane and dichlorotetrafluorocyclobutane; and fluoride-substituents of organic compounds such as alcohol, acid and ketone.

They may be used alone or in combinations.

Further, these compounds may provided with an ethylenically unsaturated group in a molecule. The foregoing compounds can be used also in combinations.

In case of utilizing a fluorine-contained organic compound as a reactive gas useful for the invention, a content of a fluorine-contained organic compound as a reactive gas in a reaction gas is preferably from 0.01 to 10 volume % and more preferably 0.1 to 5 volume %, in respect to forming a uniform thin layer on a cellulose ester film by plasma discharge treatment.

Further, in case that a fluorine-contained organic compound, which is utilized preferably in the invention, is a gas under ordinary temperatures and pressures, it can be used as it is as a component of a reactive gas.

Further, in case that a fluorine-contained organic compound is a liquid or solid under ordinary temperatures and pressures, it may be used, for example, by being vaporized by means of such as heat or reduced pressure, or by being dissolved in a suitable organic solvent.

As a silicon compound as a reactive gas useful in the invention, for example, organometallic compounds such as dimethylsilane and tetramethylsilane; metal hydrogen compounds such as monosilane and disilane; metal halogenide compounds such as dichlorosilane, trichlorosilane and tetrafluorosilane; alkoxy silanes such as tetramethoxy silane, tetraethoxy silane, tetrapropoxy silane, dimethyldiethoxy silane, methyltrimethoxy silane and ethyltriethoxy silane; and organosilanes can be preferably utilized, however, the invention is not limited thereto.

Further they can be utilized suitably in combinations. Other organic compounds may also be added to change or control physical property of a layer.

In the invention, in case of utilizing silicon compound as a reactive gas, a content of a silicon compound as a reactive gas in a reaction gas is preferably from 0.01 to 10 volume % and more preferably 0.1 to 5 volume %, in respect to forming a uniform thin layer on a cellulose ester film by plasma discharge treatment.

A organometallic compound as a reactive gas useful in the invention is not specifically limited and includes metal compounds to form metal oxides of, such as Al, As, Au, B, Bi, Sb, Ca, Cd, Cr, Co, Cu, Fe, Ga, Ge, Hg, In, Li, Mg, Mn, Mo, Na, Ni, Pb, Pt, Rh, Se, Si, Sn, Ti, Zr, Y, V, W and Zn.

For example, to form a high refractive index layer of an anti-reflection layer, a titanium compound is preferred and it includes, concretely, for example, organic amino metallic compounds such as tetradimethylamino titanium, metal hydrogen compounds such as monotitane and dititane, metal halogenides such as dichlorotitane, trichlorotitane and tetrachlorotitane, and metal alkoxides such as tetraethoxy titane, tetraisopropoxy titane and tetrabutoxy titane.

In the invention, a silicon compound and an organometallic compound is preferably a metal hydrogen compound or a metal alkoxide in respect to handling, and among them is preferably utilized is a metal alkoxide because of no generation of a corrosive or poisonous gas and minimal contamination of the process.

In the invention, in case of utilizing an organometallic compound as a reactive gas, a content of a organometallic compound as a reactive gas in reaction gas is preferably from 0.01 to 10 volume % and more preferably 0.1 to 5 volume %, in respect to forming a uniform thin layer on a cellulose ester film by plasma discharge treatment.

Further, to introduce a metal compound such as a silicon compound and a titanium compound to an electric discharge portion, both of them can be used in any state of gas, liquid or solid under ordinary temperatures and pressures.

In case of gas, it can be introduced to an electric discharge portion as it is, however, in case of liquid or solid it can be utilized by being vaporized by use vaporization means such as heat, reduced pressure and ultrasonic irradiation.

In case of utilizing an organometallic compound such as a titanium compound being vaporized by means of heat, a metal alkoxide such as tetraethoxy silane and tetrapropoxy silane which is liquid at ordinary temperatures and has a boiling point of not higher than 200° C. is preferred to form a metal oxide thin layer of the invention. Alkoxides described above may be utilized by diluting with organic solvents and as an organic solvent such as methanol, ethanol and n-hexane or the mixed organic solvent thereof can be used.

Further, physical property such as hardness and density of a thin layer can be controlled by including such as oxygen, hydrogen, carbon dioxide, carbon monoxide, nitrogen, nitrogen dioxide and nitrogen monoxide in a reactive gas at a content of from 0.1 to 10 volume %.

An amorphous metal oxide layer comprised of such as silicon oxide and titanium oxide can be preferably prepared according to the foregoing method.

An optical film of the invention can be preferably utilized for, for example, an optical film having an anti-reflection layer comprised of accumulated layers of a low refractive index layer and a high refractive index layer, or an optical film having an electric conductive layer or a anti-static layer.

In the invention, multiple thin layers can be prepared continuously and a multi-layered accumulated material having no unevenness of a thin layer can be prepared, by providing plural plasma discharge apparatuses.

For example, in case of preparing an optical film having an anti-reflection layer on a cellulose ester film, it can be prepared efficiently by accumulating, a high refractive index layer having a refractive index of from 1.6 to 2.3 and a low refractive index layer having a refractive index of from 1.3 to 1.5, continuously on the surface of a cellulose ester film.

A low refractive index layer is preferably a fluorine-contained compound including layer which is formed by plasma discharge treatment utilizing a gas containing a fluorine-contained organic compound or a layer containing mainly silicon oxide which is formed by plasma discharge treatment utilizing an organic silicon compound such as alkoxysilane; and a high refractive index layer is preferably a metal oxide layer which is formed by plasma discharge treatment utilizing a gas containing an organic metal compound, for example, a layer including titanium oxide or zirconium oxide.

There are utilized thin layer forming methods described above, however, the invention is not limited thereto and neither the layer constitution is limited thereto. For example, an anti-stain layer may be formed on the outermost surface by plasma discharge treatment under the presence of a fluorine-contained organic compound gas and under atmospheric pressure or the vicinity.

In the invention, according to the method described above, a multi-layered thin layer can be accumulated to obtain a uniform optical film having no uneven thickness of each layer.

A thickness of a thin layer such as a metal oxide layer is determined by preparing a cross section of an accumulated material and observing through a transmission electron microscope (hereinafter, referred as TEM)

The preparation of a cross section can be performed, concretely, by burying an accumulated material together with a base material in an epoxy burying resin for pre-treatment of electron microscope observation; followed by preparing a ultra-thin slice having a thickness of approximately 80 nm by use of a ultra-microtome equipped with a diamond knife or by cutting out a thin sliced cross section having a thickness of approximately 100 nm by means of focused scanning of Ga ion beam on the surface of an accumulated material using a focused ion beam (FIB) processing apparatus.

The observation by TEM is performed at a magnification of from 50,000 to 500,000 times with respect to bright ground images, and images are recorded on a film, imaging plate or CCD camera.

An acceleration voltage of TEM is preferably from 80 to 400 kV and specifically preferably from 80 to 200 kV.

Further, details of observation techniques of electron-micrograph and preparation techniques of sample preparation can be referred to "Observation methods of electron-micrograph in medical science and biology, edited by Kantoshibu of Japan electron-micrograph society" (published by Maruzen), "Preparation methods of biological samples for electron-micrograph, edited by Kanto-shibu of Japan electron-micrograph society" (published by Maruzen) and "Electron-micrograph Q&A" (published by Agneshyofu Co.), respectively.

TEM images recorded on a suitable medium is decomposed into 1024×1024 pixels, preferably 2048×2048 pixels, per one sheet of an image, and preferably subjected to image processing by a computer.

Details of image processing technology can be referred to "Application technology of image processing, edited by Hiroshi Tanaka (published by Kogyo-chosakai)", and image processing programs or apparatuses are not specifically limited, provided that operations described above is possible, and an example thereof includes an image processing software Image-Pro PLUS, produced by MEDIA CYBERNETICS Co.

To perform an image processing, an analogue image recorded on a film is converted to a digital image by such as a scanner, and preferably subjected optionally to shading correction, contrast/edge enhancement. Thereafter, a histogram is formed, and portions corresponding to an interface of an accumulated material is extracted by binarization process to measure the thickness between the interfaces.

In a similar manner, a mean layer thickness and the variation can be calculated from the values obtained for not less than 25 points and preferably not less than 50 points.

In this way, the invention can provide optical films provided with a metal oxide compound layer having various functions.

According to the invention, an optical film having a metal oxide layer with markedly improved crack generation can be provided, and the optical film showed minimal curl and depressed degradation of performances caused such as by decreased electric conductivity or milky-whitening even under repeated exposure to conditions of high temperature and humidity. Further, the invention can provide an optical film having markedly depressed uneven layer thickness (coating unevenness).

An optical film of the invention is useful specifically as a protective film of a polarizing plate, and a polarizing plate can be prepared by utilization thereof according to a method well known in the art.

A polarizing plate which is provided with the optical film, or a display device provided with the optical film is superior in visibility and has been successful in providing superior visibility even under extreme environment.

An optical film of the invention is preferably utilized for such as an anti-reflection film, an anti-static film, a phase deference film, an electric conductive film, an electromagnetic wave shielding film, a protecting film of such as a polarizing plate, an optical compensation film, a vision range widening film, a polarizing plate and a front filter of a plasma display.

Further, an optical film of the invention is preferably utilized in liquid crystal display devices of a reflection-type, a transmission-type and a semi-transmission type; or in liquid crystal display devices of various operating methods of such as TN-type, STN-type, OCB-type, HAN-type, VA-type and IPS-type; and also can be utilized in various display devices such as a plasma display device, an organic EL display device and an inorganic EL display device.

EXAMPLES

The invention will be concretely explained according to examples as follows; however, embodiments of the invention are not limited thereto.

Example 1

Each cellulose ester shown in Table 1 (TAC1 to TAC8) was prepared according to an ordinary method.

Preparation of Dope A1: Cooled Dissolution

Raw materials described below were charged in a closed vessel, stirred at 30° C. for 20 min., and after the mixture was cooled down to −75° C. it was heated up to 45° C. to obtain a transparent dope. After being subjected to a defoaming operation, the solution was filtered through Azumi Filter Paper No. 244 produced by Azumi Roshi Co., Ltd. to prepare dope A1.

| Cellulose ester (TAC1) | 100 kg |
| TPP | 11 kg |
| BDP | 3 kg |
| UV-1 | 1 kg |
| Methyl acetate | 440 kg |
| Ethanol | 110 kg |

Preparation of Dope A9: Ordinary Temperature Dissolution

Raw materials described below were charged in a closed vessel, stirred at 30° C. for 20 min., followed by complete dissolution while being heated and stirred.

A dope was allowed to stand to be cooled down to 30° C., and after being subjected to a defoaming operation was filtered twice by use of Azumi Filter Paper No. 244 produced by Azumi Roshi Co., Ltd. to prepare dope A9.

| Cellulose ester (TAC6) | 100 kg |
|---|---|
| TPP | 11 kg |
| BDP | 3 kg |
| UV-1 | 1 kg |
| Methyl acetate | 440 kg |
| Ethanol | 110 kg |

Using each TAC resin, each dope A1 to A12 was prepared by utilizing each additive, solvent and dissolution method described in Table 1.

Coating and Drying

Dope A1 described above was cast on a stainless steel support having a surface temperature of 40° C. Being dried with a drying air of 60° C., a film was peeled off from the support which was cooled at 10° C. at 60 seconds after casting. The peeled off film was stretched by a tenter in the width direction (TD) and the longitudinal direction (MD) by 1.1 times and 1.05 times respectively, being dried at 100° C., width clips were released at a residual solvent amount of 3%, drying was finished in a drying zone of 130° C. while further being transported by many rolls, and the film was subjected to a knurling operation to give 10 mm width and 8 μm height knuring on both edges of the film to prepare cellulose ester film 1 having a thickness of 60 μm. The film width was 1300 mm and the wounded length was 2,500 m.

Films 2 to 12 were prepared by using each dope in a similar manner except that use of a tenter and time from casting to peeling off were changed as described in Table 1. Herein, the item of a tenter in Table 1 shows that the preparation was performed by the foregoing method when referred as "yes" and under free shrinkage without stretching when referred as "no".

Each optical film 1 to 12 was obtained by providing prepared each film with a metal oxide layer according to the following methods described below.

Formation of Metal Oxide (Tin Oxide) Layer

A metal oxide layer is formed on each cellulose ester film by means of atmospheric pressure plasma discharge treatment. The atmospheric pressure plasma discharge treatment was performed by use of an apparatus illustrated in FIG. 2. As a roll electrode, utilized is a jacket roll base material made of stainless steel, which has a cooling function by means of silicone oil circulation. Alumina is covered thereon at a thickness of 1 mm by ceramic spattering, and after a solution of tetramethoxysilane diluted with ethyl acetate being coated thereon and dried, it was subjected to a pore sealing treatment through curing by UV-irradiation to prepare a roll electrode provided with a dielectric having a Rmax of 1 μm, which is connected to an earth (grounded).

On the other hand, as counter electrodes, a hollow stainless steel pipe is covered with a dielectric similar to the above in the same conditions to be a group of electrodes which were standing opposite. As an electric power source of a plasma discharge treatment apparatus, utilized was a high frequency power source produced by Nippon Denshi, and 4 W/cm2 of electric power, by adjusting a continuous frequency number to 13.56 MHz, was supplied. Herein, the roll electrode was rotated by use of a drive being synchronized with transportation of a cellulose ester film.

Herein, a metal oxide layer having a thickness of 0.1 μm was formed by adjusting the electrode gap to 2 mm and the pressure of a reactive gas to +1 kPa against atmospheric pressure. The reactive gas composition utilized in a plasma discharge treatment is described below.

Reactive Gas for Preparation of Metal Oxide (Tin Oxide) Layer

| Inert gas (helium) | 99.4 volume % |
|---|---|
| Reactive gas (oxygen) | 0.3 volume % |
| Reactive gas (tetrabutyltin vapor) | 0.3 volume % |

Each film, after having been kept at 80° C. and 90% RH for three days, was evaluated in respect with cracks generated in the surface of a tin oxide layer and curl of each film.

Crack Evaluation

Cracks generated in a tin oxide layer which had been formed on the surface of each cellulose ester film were observed visually and through an electron microscope. The evaluation ranks are as follows:
A: cracks were hardly observed, superior in transparency,
B: cracks were observed, however, no milky whitening,
C: cracks were observed and slight milky whitening,
D: marked cracks were generated and milky whitening.

Curl Evaluation

A sample sheet of 20 cm×20 cm was cut out from a film on which a tin oxide layer had been formed, and, after being kept in a conditioning room at a temperature of 25° C. and a humidity of 55% RH for 24 hours, a rising distance of each four corner was measured while being placed on a flat board, to evaluate curl based on the maximum value thereof. The evaluation ranks are as follows:
A: less than from 0 to 2 mm,
B: less than from 2 to 5 mm,
C: less than from 5 to 20 mm,
D: not less than 20 mm.

The results are shown in Table 2.

TABLE 1

| Cellulose ester film | Dope | Cellulose ester (100 kg each) | | | | Additive (kg) | Dissolution method | Solvent (kg) | Peeling time (sec.) | Tenter | Remarks |
|---|---|---|---|---|---|---|---|---|---|---|---|
| | | TAC | Substituent | Subst. Degree | Mw/Mn | | | | | | |
| 1 | A1 | 1 | Acetyl | 2.75 | 1.7 | TPP(11), BDP(3), UV-1(1) | Cooled | *1 | 60 | Yes | Inv. |
| 2 | A2 | 1 | Acetyl | 2.75 | 1.7 | E-1(10), UV-2(1) | Cooled | *1 | 60 | Yes | Inv. |

TABLE 1-continued

| Cellulose ester film | Dope | Cellulose ester (100 kg each) | | | | Additive (kg) | Dissolution method | Solvent (kg) | Peeling time (sec.) | Tenter | Remarks |
| --- | --- | --- | --- | --- | --- | --- | --- | --- | --- | --- | --- |
| | | TAC | Substituent | Subst. Degree | Mw/Mn | | | | | | |
| 3 | A3 | 1 | Acetyl | 2.75 | 1.7 | EPEG(4), PDCH(6) UV-2(1) | Cooled | *1 | 60 | Yes | Inv. |
| 4 | A4 | 2 | Acetyl | 2.75 | 2.2 | E-1(10), UV-2(1) | Cooled | *1 | 60 | Yes | Inv. |
| 5 | A5 | 3 | Acetyl | 2.60 | 2.5 | TPP(11), BDP(3), UV-1(1) | Cooled | *1 | 60 | Yes | Inv. |
| 6 | A6 | 4 | Acetyl | 2.88 | 3.0 | E-1(10), UV-2(1) | Cooled | *1 | 90 | Yes | Inv. |
| 7 | A7 | 5 | Acetyl Propionyl | 2.00 0.80 | 2.0 | E-1(10), UV-2(1) | Cooled | *1 | 60 | Yes | Inv. |
| 8 | A8 | 5 | Acetyl Propionyl | 2.00 0.80 | 2.0 | E-1(10), UV-2(1) | Cooled | *1 | 60 | Yes | Inv. |
| 9 | A9 | 6 | Acetyl Propionyl | 1.90 0.70 | 2.5 | TPP(11), BDP(3), UV-1(1) | Ordinary temperature | *1 | 60 | Yes | Inv. |
| 10 | A10 | 3 | Acetyl | 2.60 | 2.5 | TPP(11), BDP(3), UV-2(1) | Cooled | *1 | 90 | No | Comp. |
| 11 | A11 | 7 | Acetyl | 2.50 | 2.5 | TPP(11), BDP(3), UV-2(1) | Cooled | *1 | 90 | Yes | Comp. |
| 12 | A12 | 8 | Acetyl | 2.75 | 4.0 | TPP(11), BDP(3), UV-2(1) | Cooled | *1 | 90 | No | Comp. |

Values in ( ) after each material express weight (kg).
*1: Methyl acetate (440), Ethanol (110)
Inv.; Invention Comp.; Comparison TPP: triphenyl phosphate
BDP: biphenyl diphenyl phosphate
EPEG: ethylphthalyl ethylglycolate
PDCH: dicyclohexyl phthalate
UV-1: 5-chloro-2-(3,5-di-sec-butyl-2-hydroxyphenyl)-2H-benzotriazole
UV-2: 2-hydroxy-4-benzyloxy benzophenone
E-1: exemplary compound

TABLE 2

| Optical film | Cellulose ester film | Crack evaluation | Curl evaluation | Remarks |
| --- | --- | --- | --- | --- |
| 1 | 1 | A | B | Invention |
| 2 | 2 | A | A | Invention |
| 3 | 3 | A | A | Invention |
| 4 | 4 | A | A | Invention |
| 5 | 5 | A | B | Invention |
| 6 | 6 | B | B | Invention |
| 7 | 7 | A | A | Invention |
| 8 | 8 | A | A | Invention |
| 9 | 9 | A | A | Invention |
| 10 | 10 | C | C | Comparison |
| 11 | 11 | C | C | Comparison |
| 12 | 12 | C | C | Comparison |

A tin oxide layer was formed on each cellulose ester film to provided an electric conductive layer. As a result, excellent results have been obtained; an optical film of the invention has minimal curl and minimal crack generation.

Example 2

A hard coat layer was formed on each cellulose ester film (a film before being provided with a tin oxide layer) prepared in Example 1 and a titanium oxide layer (a high refractive index layer) and a silicon oxide layer (a low refractive index layer) were formed thereon by a plasma treatment to prepare optical films 13 to 24 of the invention. Preparation of a hard coat layer coating solution and formation of a hard coat layer MEK solution (solid concentration: 72%, silica content: 38%) of a hard coat material Desolite Z7503, manufactured by JSR Co., of 625 g was dissolved in 375g of a solvent mixture of methyl ethyl ketone/cyclohexanone=50/50 weight %. The mixture, after having been stirred, was filtrated through a polypropyrene filter having a pore diameter of 0.4 µm to prepare a coating solution of a hard coat layer.

The foregoing coating solution for a hard coat layer was coated on each cellulose ester film by use of a bar coater, and the coated layer, after having been dried at 90° C., was cured by UV irradiation to form a hard coat layer (refractive index: 1.49) having a thickness of 6 µm.

Formation of a Titanium Oxide Layer (a High Refractive Index Layer) and a Silicon Oxide Layer (a Low Refractive Index Layer) by Plasma Treatment Utilizing the plasma discharge treatment apparatus which was used in Example 1, the first titanium oxide layer (refractive index: 2.15, mean layer thickness: 15 nm), the first silicon oxide layer (refractive index: 1.46, mean layer thickness: 33 nm), the second titanium oxide layer (refractive index: 2.15, mean layer thickness: 119 nm) and the second silicon oxide layer (refractive index: 1.46, mean layer thickness: 86 nm) were formed in this order on a UV cured resin layer of each cellulose ester film (1 to 12) having been provided with the foregoing UV cured resin layer (hard coat layer) to prepare optical films 13 to 24 described in Table 3. As an electric power source for the plasma discharge treatment apparatus, utilized was a high frequency power source, produced by Pearl Kogyo Co., and an electric power of 6W/cm$^2$ was supplied to a discharge electrode with a continuous frequency number being adjusted to 2 MHz. A roll electrode was rotated by use of a drive being synchronized with transportation of a cellulose ester film.

Herein, the preparation was performed under an electrode gap of 2 mm, and a pressure of a reactive gas of atmospheric pressure+1 kPa. The compositions of a reactive gas utilized for a plasma discharge treatment were shown below. Wherein, liquid components in a reactive gas were supplied to an electric discharge portion as a vapor by use of a vaporization device and being heated at 100° C.

Reactive Gas for Preparation of Titanium Oxide Layer (High Refractive Index Layer)

| | |
|---|---|
| Inert gas (helium) | 99.4 volume % |
| Reactive gas (oxygen) | 0.3 volume % |
| Reactive gas (tetraisopropoxy titanium vapor) | 0.3 volume % |

Reactive Gas for Preparation of Titanium Oxide Layer (Low Refractive Index Layer)

| | |
|---|---|
| Inert gas (helium) | 99.4 volume % |
| Reactive gas (oxygen) | 0.3 volume % |
| Reactive gas (tetraethoxy silane vapor) | 0.3 volume % |

Each optical film prepared was evaluated with respect to crack and curl in a similar manner to example 1. Further, measurement of reflectance and evaluation of visibility of a liquid crystal panel comprised of the optical film were performed.

Measurement of Reflectance

As a spectral reflectance of each sample, measured was a mean reflectance within a range of from 450 to 650 nm, by use of a spectrophotometer U-4000 type (produced by Hitachi Corp.) under a condition of 5 degree normal reflection. After the back-side surface of the observation side was subjected to a surface roughening treatment followed by a light absorbing treatment by use of a black-colored spray to prevent reflection of light at the back-side surface of a film, reflectance was measured.

Preparation of Liquid Crystal Panel and Evaluation of Visibility

Visibility was evaluated, by preparing a polarizing plate comprised of each optical film prepared above as shown below and by pasting up the plate on a liquid crystal display device.

Preparation of Polarizing Plate (a) Preparation of Polarizing Film

A polyvinyl alcohol film having a thickness of 120 μm was uni-axially stretched (at a temperature of 110° C. and a stretching magnification of 5 times). This was immersed in a aqueous solution comprising a ratio of 0.075 g of iodine, 5 g of potassium iodide and 100 g of water for 60 seconds, and then in a aqueous solution comprising a ratio of 6 g of potassium iodide, 7.5 g of boric acid and 100 g of water being kept at 68° C. This was washed with water and dried to obtain a long roll of polarizing film.

(b) Preparation of Polarizing Plate

Next, polarizing plate was prepared by pasting up a polarizing film and each protective film of a polarizing plate each other according to the following processes 1 to 5.

Process 1: Each optical film prepared in Example 2 was immersed in 2 mol/L sodium hydroxide solution at 60° C. for 90 seconds, followed by being washed with water and dried. The surface provided with a metal oxide layer was protected from alkali by pasting up a delaminatable protective film (PET) in advance.

Each cellulose ester film prepared in Example 1 (without a metal oxide layer) was immersed in 2 mol/L sodium hydroxide solution at 60° C. for 90 seconds, followed by being washed with water and dried.

Process 2: The polarizing films described above were immersed in a polyvinyl alcohol adhesive bath having a solid content of 2 weight % for 1 to 2 seconds.

Process 3: An excess adhesive having been adhered on a polarizing film in Process 2 was removed by slight wiping, and the film was arranged to make an accumulation by being sandwiched with a cellulose ester film which had been alkali treated in Process 1 and an optical film comprised of the same cellulose ester film.

Process 4: Pasting up was performed by use of two rotating rolls at a pressure of from 20 to 30 N/cm$^2$ and a speed of approximately 2 m/min. In this occasion, the process was performed with caution not to incorporate bubbles.

Process 5: Each polarizing plate was prepared by drying the samples prepared in Process 4 in a drier at 80° C. for 3 minutes.

Evaluation as a Liquid Crystal Display Device

A liquid crystal display device was prepared by peeling a polarizing plate off carefully from the observing side of a liquid crystal display panel available on the market (Color liquid crystal display MultiSync LCD 1525J: Type LA-1529HM, produced by NEC) and pasting up the polarizing plate prepared above while placing the metal oxide layer outside and aligning a polarizing direction.

Each crystal display panel prepared above was evaluated as follows.

Visibility Evaluation

Crystal liquid displays were evaluated visually.

A: black is tight and distinct to yield good contrast, and no color shading of reflective light is observed, B: black is tight and distinct to yield good contrast, however, slight color shading of reflective light is observed, C: black is loose and somewhat inferior in distinction to yield inferior contrast, and color shading of reflective light is observed, D: black is loose and inferior in distinction to yield inferior contrast, and color shading of reflective light is significant.

Evaluation results are shown in Table 3.

TABLE 3

| Optical film | Cellulose ester film | Crack | Curl | Reflectance (%) | Visibility | Remarks |
|---|---|---|---|---|---|---|
| 13 | 1 | B | B | 0.3 | B | Invention |
| 14 | 2 | A | A | 0.3 | A | Invention |
| 15 | 3 | A | A | 0.3 | A | Invention |
| 16 | 4 | A | A | 0.3 | A | Invention |
| 17 | 5 | B | B | 0.3 | B | Invention |
| 18 | 6 | B | B | 0.3 | B | Invention |
| 19 | 7 | A | A | 0.3 | A | Invention |
| 20 | 8 | A | A | 0.3 | A | Invention |
| 21 | 9 | A | B | 0.3 | A | Invention |
| 22 | 10 | C | C | 0.4 | C | Comparison |
| 23 | 11 | C | C | 0.4 | C | Comparison |
| 24 | 12 | C | C | 0.4 | C | Comparison |

Samples of the invention showed minimal curl and few cracks, as well as a low reflectance of the surface, and have been proved to exhibit superior visibility when they comprise a liquid crystal display device.

Example 3

A metal oxide layer (containing titanium oxide) was formed by coating on the cellulose ester films prepared in Example 2 provided with a hard coat layer.

Preparation of a Medium Refractive Index Layer/a High Refractive Index Layer/a Low Refractive Index Layer Preparation of Titanium Dioxide Dispersion Titanium oxide (primary particle weight average diameter: 50 nm, refractive index: 2.70) of 30 weight parts, 4.5 weight parts of an anionic diacrylate monomer (PM21, manufactured by Nippon Kayaku Co., Ltd.), 0.3 weight parts of a cationic methacrylate monomer (DMAEA, manufactured by Kojin Co., Ltd.) and 65.2 weight parts of methyl ethyl ketone were dispersed by a sand grinder to prepare a titanium dioxide dispersion.

Preparation of a Coating Solution for a Medium Refractive Index Layer

A photopolymerization initiator (Irgacure 907, manufactured by Ciba Geigy Co.) of 0.14 g and a photosensitizer (Kayacure DETX, manufactured by Nippon Kayaku Co., Ltd.) of 0.04 g were dissolved in 151.9 g of cyclohexanone and 37.0 g of methyl ethyl ketone. Further, after 6.1 g of the foregoing titanium dioxide dispersion and 2.4 g of a mixture of dipentaerythritol pentaacrylate and dipentaerythritol hexaacrylate (DPHA, manufactured by Nippon Kayaku Co., Ltd.) being added and stirred at room temperature for 30 minutes, the solution was filtered through a polypropyrene filter having a pore size of 0.4 μm to prepare a coating solution for a medium refractive index layer. The coating solution was coated and dried on a cellulose ester film, and after being cured by UV ray, refractive index was measured to obtain a medium refractive index layer having a refractive index of 1.72.

Preparation of a Coating Solution for a High Refractive Index Layer

A photopolymerization initiator (Irgacure 907, manufactured by Ciba Geigy Co.) of 0.06 g and a photosensitizer (Kayacure DETX, manufactured by Nippon Kayaku Co., Ltd.) of 0.02 g were dissolved in 1152.8 g of cyclohexanone and 37.2 g of methyl ethyl ketone. Further, after the foregoing titanium dioxide dispersion and the mixture of dipentaerythritol pentaacrylate and dipentaerythritol hexaacrylate (DPHA, manufactured by Nippon Kayaku Co., Ltd.) being added, while increasing titanium dioxide ratio so as to adjust the refractive index to match a high index refractive index layer, and the system being stirred at room temperature for 30 minutes, the solution was filtered through a polypropyrene filter having a pore size of 0.4 μm to prepare a coating solution for a high refractive index layer. The coating solution was coated and dried on a cellulose ester film, and after being cured by UV ray, refractive index was measured to obtain a high refractive index layer having a refractive index of 1.95.

Preparation of a Coating Solution for a Low Refractive Index Layer

Silane coupling agent (KBM-503, manufactured by Shinetsu Silicone Co., Ltd.) of 3 g and 0.1 M/L hydrochloric acid of 2 g were added to 200 g of a methanol dispersion solution of silica fine particles having a mean particle diameter of 15 nm (Methanol silica sol, manufactured by Nissan Kagaku Co., Ltd.) and after being stirred at room temperature for 5 hours, the system was kept standing for three days to obtain a dispersion of silica fine particles having been subjected to silane coupling treatment. Isopropyl alcohol of 58.35 g and diacetone alcohol of 39.34 g were added to 35.04 g of the dispersion. Further, a solution, in which 102 g of a photopolymerization initiator (Irgacure 907, manufactured by Ciba Geigy Co.) and 0.51 g of a photosensitizer (Kayacure DETX, manufactured by Nippon Kayaku Co., Ltd.) were dissolved in 772.85 g of isopropyl alcohol, was added to the system, and 25.6 g of a mixture of dipentaerythritol pentaacrylate and dipentaerythritol hexaacrylate (DPHA, manufactured by Nippon Kayaku Co., Ltd.) was added and dissolved. The solution obtained of 67.23 g was added to a mixture of the foregoing dispersion, isopropyl alcohol and diacetone alcohol. The mixture was stirred at room temperature for 20 minutes and filtered through a polypropyrene filter having a pore size of 0.4 μm to prepare a coating solution for a low refractive index layer. The coating solution was coated and dried on a cellulose ester film, and after being cured by UV ray, a refractive index was measured to be 1.45.

Preparation of Anti-reflection Film

The foregoing coating solution for a medium refractive index layer was coated by utilizing a bar coater, on the cellulose ester films prepared in Example 2 provided with a hard coat layer, and after being dried at 60° C., the coated layer was cured by irradiating UV ray to form a medium refractive index layer (refractive index: 1.72). The foregoing coating solution for a high refractive index layer was coated thereon by utilizing a bar coater, and after being dried at 60° C., the coated layer was cured by irradiating UV ray to form a high refractive index layer (refractive index: 1.95). The foregoing coating solution for a low refractive index layer was coated further thereon by utilizing a bar coater, and after being dried at 60° C., the coated layer was cured by irradiating UV ray to form a low refractive index layer (refractive index: 1.45).

For each sample obtained, evaluations with respect to crack, as well as visibility of a liquid crystal display panel composed of the sample and further the following evaluation on unevenness of a layer thickness were performed.

Evaluation on Unevenness of Layer Thickness

Unevenness of layer thickness, that is coating unevenness, of each optical film was evaluated according to the following criteria.

A mean layer thickness of a metal oxide layer formed on the surface of a cellulose ester film was determined by preparing a section of an accumulation and observing the section through a transmission electron microscope (hereinafter referred as TEM).

A section was prepared by burying an accumulation together with a base material in an epoxy burying resin for pretreatment of electron microscopy observation, and the surface of the accumulation being focusing scanned with Ga ion beam by use of a focused ion beam (FIB) to cut out a section of a thin slice having a thickness of approximately 100 nm.

In observation through TEM, it was performed at a magnification of from 50,000 to 500,000 times and images in bright ground were observed and recorded. Unevenness of layer thickness (coating unevenness) was determined as a difference (nm) between the maximum and the minimum of the layer thickness based on values obtained at arbitrary 25 points in a area of 5 cm×5 cm. Evaluation ranks are as follows:

A: less than 1 nm,
B: less than from 1 to 4 nm,
C: less than from 4 to 10 nm,
D: not less than 10 nm.

The evaluation results are shown in Table 4. In the table they are expressed as coating unevenness.

TABLE 4

| Optical film | Cellulose ester film | Crack | Coating unevenness | Visibility | Remarks |
| --- | --- | --- | --- | --- | --- |
| 25 | 1 | B | B | B | Invention |
| 26 | 2 | A | A | A | Invention |
| 27 | 3 | A | A | A | Invention |
| 28 | 4 | A | A | A | Invention |
| 29 | 5 | B | B | B | Invention |
| 30 | 6 | B | B | A | Invention |

TABLE 4-continued

| Optical film | Cellulose ester film | Crack | Coating unevenness | Visibility | Remarks |
|---|---|---|---|---|---|
| 31 | 7 | A | A | A | Invention |
| 32 | 8 | A | A | A | Invention |
| 33 | 9 | A | B | B | Invention |
| 34 | 10 | C | C | C | Comparison |
| 35 | 11 | C | C | C | Comparison |
| 36 | 12 | C | C | C | Comparison |

It is clear that samples of the invention have minimal crack as well as minimal unevenness of layer thickness and are superior in visibility as a liquid crystal display device comprising the samples.

By utilizing a cellulose ester film of the invention, an optical film, having minimal crack as well as minimal coating unevenness, small curl of the film and excellent visibility is obtained.

What is claimed is:

1. A process for producing an optical film comprising the steps of:
    (a) casting a dope comprising a cellulose ester and a non-chlorinated solvent on a metal support, the cellulose ester having a total acyl substitution degree of 2.6 to 2.85 and having a ratio of a weight-average molecular weight to a number-average molecular weight of 1:1 to 3:1;
    (b) drying the cast dope on the metal support so as to obtain a cellulose ester film;
    (c) peeling the cellulose ester film from the metal support;
    (d) further drying the cellulose ester film while providing a longitudinal stretch or a lateral stretch to the cellulose ester film; and
    (e) providing a metal oxide layer on the cellulose ester film using a plasma CVD method, wherein
    the plasma CVD method is carried out under atmospheric pressure.

2. The process of claim 1, further comprising the step of:
    (f) providing an interlayer between the cellulose film and the metal oxide layer.

3. The process of claim 1, wherein the step of peeling the cellulose ester film from the metal support is finished within 60 seconds after casting the dope on the metal support.

4. The process of claim 1, wherein the step of peeling the cellulose ester film from the metal support is finished within 60 seconds after casting the dope on the metal support, and the process further comprising the step of:
    (f) providing an interlayer between the cellulose film and the metal oxide layer.

5. The process of claim 1, wherein the dope is prepared with a cold dissolving method.

6. The process of claim 1, wherein the dope further comprises an additive in an amount of 0.5 to 30 weight % based on the total weight of the dope, the additive being a compound having at least three substituents selected from the group consisting of a phenyl group, a cycloalkyl group and a cycloalkenyl group.

7. The process of claim 6, wherein the additive is a non-phosphoric acid ester additive.

8. The process of claim 1, wherein the metal oxide layer comprises metal oxide particles.

9. The process of claim 2, wherein the interlayer is a cured resin layer of an actinic ray curable resin or a heat curable resin.

* * * * *